US006683924B1

(12) United States Patent
Ottosson et al.

(10) Patent No.: US 6,683,924 B1
(45) Date of Patent: Jan. 27, 2004

(54) APPARATUS AND METHODS FOR SELECTIVE CORRELATION TIMING IN RAKE RECEIVERS

(75) Inventors: Tony Ottosson, Gothenburg (SE); Yi-Pin Eric Wang, Cary, NC (US); Gregory Edward Bottomley, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/420,957

(22) Filed: Oct. 19, 1999

(51) Int. Cl.[7] ............................. H04L 27/06; H04B 7/216
(52) U.S. Cl. ........................................ 375/343; 370/342
(58) Field of Search ..................... 375/343, 208, 375/222, 355; 342/263, 357; 455/456

(56) References Cited

U.S. PATENT DOCUMENTS

| | | | | |
|---|---|---|---|---|
| 5,530,716 A | * | 6/1996 | Lipa ............................ | 370/342 |
| 5,572,552 A | | 11/1996 | Dent et al. ................... | 375/343 |
| 5,615,209 A | | 3/1997 | Bottomley ................... | 370/342 |
| 5,673,291 A | | 9/1997 | Dent ........................... | 375/262 |
| 5,949,816 A | * | 9/1999 | Okamoto ..................... | 375/150 |
| 5,973,642 A | * | 10/1999 | Li et al. ....................... | 342/378 |
| 6,052,406 A | * | 4/2000 | Epstein et al. ............... | 375/134 |
| 6,154,487 A | * | 11/2000 | Murai et al. ................. | 375/150 |
| 6,275,186 B1 | * | 8/2001 | Kong .......................... | 342/363 |

FOREIGN PATENT DOCUMENTS

| | | |
|---|---|---|
| EP | 0 749 215 A2 | 12/1996 |
| EP | 0825 727 A1 | 2/1998 |
| WO | WO 96/10873 | 4/1996 |
| WO | WO 01/13530 | 2/2001 |

OTHER PUBLICATIONS

Adachi et al., "Wideband DS–CDMA for Next–Generation Mobile Communications Systems," IEEE Communications Magazine, Sep., 1998, pp. 56–69.

Barbosa et al., "Adaptive Detection of DS/CDMA Signals in Fading Channels," IEEE Trans. Commun., vol. 46, pp. 115–124, Jan. 1998.

Bottomley et al., "Adaptive Arrays and MLSE Equalization," Proc. 1995 IEEE 45th Vehicular Technology Conference (VTC '95), Chicago, Jul. 25–28, 1995, 5 pgs.

Bottomley, "Optimizing the Rake Receiver for the CDMA Downlink," Proceedings of the 43rd IEEE Vehicular Technology Conference, Secaucus, NJ, May 18–20, 1993.

Dahlman et al., "UMTS/IMT–2000 Based on Wideband CDMA," IEEE Communications Magazine, Sep. 1998, pp. 70–80.

Davis et al., "A Noise Whitening Approach to Multiple–Access Noise Rejection–Part II: Implementation Issues," IEEE Journal on Selected Areas in Communications, vol. 14, Oct. 1996, pp. 1488–1499.

(List continued on next page.)

*Primary Examiner*—Stephen Chin
*Assistant Examiner*—Lawrence Williams
(74) *Attorney, Agent, or Firm*—Myers Bigel Sibley & Sajovec

(57) ABSTRACT

Correlation times for a RAKE receiver are determined from time differentials between multipath components of a received signal based on correlation metrics, preferably signal strength measurements, associated with the multipath components. According to various embodiments of the present invention, selection strategies are employed in which "desired signal collecting" and "interference collecting" correlation times may be selected using average optimal (AO) or instantaneous optimal (IO) selection criteria. These criteria may include, for example, thresholds for signal strengths associated with multipath components of a signal at the correlation times, where the signal strengths may include absolute or relative measures of signal power or signal to noise ratio. According to alternative embodiments, correlation times are selected using an inverse filter of an estimated channel response. Related apparatus is also described.

58 Claims, 20 Drawing Sheets

OTHER PUBLICATIONS

Dent et al., "CDMA–IC: A Novel Code Division Multiple Access Scheme Based on Interference Cancellation," in Proc. PIMRC, Boston, Massachusetts, pp. 4.1.1–4.1.5, Oct. 1992.

Dinan et al., "Spreading Codes for Direct Sequence CDMA and Wideband CDMA Cellular Networks," IEEE Communications Magazine, Sep. 1998, pp. 48–54.

Duel–Hallen et al., "Multiuser Detection of CDMA Systems," IEEE Personal Commun. Mag., vol. 2, pp. 46–58, Apr. 1995.

Ewerbring et al., "CDMA with Interference Cancellation: A Technique for High Capacity Wireless Systems," in Proc. IEEE Int. Conf. Commun., Geneva, Switzerland, 1993.

Gumas, "A Century Old, the Fast Hadamard Transform Proves Useful in Digital Communications," Personal Engineering, Nov. 1997, pp. 57–63.

Harris et al. "Handbook of Mathematics and Computer Science," published by Springer–Verlag, New York, 1998, pp. 456–457.

Hottinen et al., "Multi–User Detection for Multi–Rate CDMA Communications," in Proc. IEEE Int. Conf. Commun., Dallas, Texas, Jun. 24–28, 1996.

Jamal et al., "Adaptive MLSE Performance on the D–AMPS 1900 Channel," IEEE Transactions on Vehicular Technology, vol. 46, Aug. 1997, pp. 634–641.

Juntti, M.J., "Multi–User Detector Performance Comparisons in Multi–Rate CDMA Systems," in Proc. IEEE VTC '98, pp. 31–35, Ottawa, Canada, May 1998.

Juntti, M.J., "System Concept Comparisons for Multi–Rate CDMA with Multi–User Detection," in Proc. IEEE VTC '98, pp. 36–40, Ottawa, Canada, May 1998.

Klein, Data Detection Algorithms Specifically Designed for the Downlink of CDMA Mobile Radio Systems, 1997 IEEE Vehicular Technology Conference, Phoenix, AZ, May 4–7, 1997.

Kohno et al., "Combination of an Adaptive Array Antenna and a Canceller of Interference for Direct–Sequence Spread–Spectrum Multiple–Access System," IEEE Journal on Selected Areas in Communication, vol. 8, No. 4, May 1990.

Liu et al., "Blind Equalization in Antenna Array CDMA Systems," IEEE Trans. Sig. Proc., vol. 45, pp. 161–172, Jan. 1997.

Madhow et al., "MMSE Interface Suppression for Direct–Sequence Spread–Spectrum Communication," IEEE Trans. Commun., vol. 42, pp. 3178–3188, Dec. 1994.

Madkour et al., "Multi–Rate Multi–Code CDMA Using FWT For Mobile and Personal Communications," in Proceedings of The Ninth IEEE International Symposium on Personal, Indoor and Mobile Radio Communications, The Marriott Copley Place, Boston, Massachusetts, Sep. 8–11, 1998.

Mailaender et al., "Linear Single–User Detectors for Asynchronous and Quasi–Synchronous CDMA," in Proc. $29^{th}$ Annual Conf. on Info. Sciences and Systems (CISS '95), Johns Hopkins University, pp. 199–204, 1995.

Monk et al., "A Noise Whitening Approach to Multiple Access Noise Rejection–Part I: Theory and Background," IEEE Journal on Selected Areas in Communications, vol. 12, Jun. 1994, pp. 817–827.

Muszynski, P., "Interference Rejection Rake–Combining for WCDMA," First Intl. Symposium on Wireless Personal Multimedia Communications (WPMC '98), Yokosuka, Japan, pp. 93–98, Nov. 4–6, 1998.

Naguib et al., "Performances of CDMA Cellular Networks with Base–Station Antenna Arrays," Presented at the 1994 International Zurich Seminar on Digital Communications, (no date).

Ng et al., "A Structured Channel Estimator for Maximum–Likelihood Sequence Detection," IEEE Commun. Letters, vol. 1, pp. 52–55, Mar. 1997.

Ojanpera et al., "Qualitative Comparison of Some Multi–User Detector Algorithms for Wideband CDMA," in Proc. IEEE VTC '98, pp. 46–50, Ottawa, Canada, May 1998.

Patel et al., "Analysis of a DS/CDMA Successive Interference Cancellation Scheme in DS/CDMA Systems Using Correlations," in Proc. GLOBECOM, Houston, Texas, pp. 76–80, 1993.

Patel et al., "Analysis of a Simple Successive Interference Cancellation Scheme in DS/CDMA System," IEEE JSAC, vol. 12, No. 5, pp. 796–807, Jun. 1994.

Pateros et al., "An Adaptive Correlator Receiver for Direct–Sequence–Spread–Spectrum Communications," IEEE Trans. Commun., vol. 44, pp. 1543–1552, Nov. 1996.

Peterson et al., "Introduction to Spread–Spectrum Communications," Prentice Hall International, Inc., pp. 540–547, 1995.

Picinbono, B., "On Circularity," IEEE Trans. Sig. Proc., vol. 42, pp. 3473–3482, Dec. 1994.

Picinbono, B., "Second–Order Complex Random Vectors and Normal Distributions," IEEE Trans. Sig. Proc., vol. 44, pp. 2637–2640, Oct. 1996.

Wang et al., "Blind Multi–User Detection: A Subspace Approach," IEEE Trans. Info. Theory, vol. 44, No. 2, pp. 677–690, Mar. 1998.

Yoon et al., "A Spread–Spectrum Multiaccess System with Cochannel Interference Cancellation for Multipath Fading Channels," IEEE J. Select. Areas Commun., vol. 11, No. 7, pp. 1067–1075, Sep. 1993.

Yoon et al., "Matched Filtering in Improper Complex Noise and Applications to DS–CMDA," Sixth IEEE Intl. Symp. Personal, Indoor, Mobile Radio Commun. (PIMRC '95), Toronto, Sep. 27–29, 1995.

Yoon et al., "Matched Filters with Interference Suppression Capabilities for DS–CDMA," IEEE J. Sel. Areas Commun., vol. 14, pp. 1510–5121, Oct. 1996.

Yoon et al., "Maximizing SNR in Improper Complex Noise and Applications to CDMA," IEEE Commun. Letters, vol. 1, pp. 5–8, Jan. 1997.

Zvonar et al., "Sub–Optimal Multi–User Detector for Frequency Selective Rayleigh Fading Synchronous CDMA Channels," IEEE Trans. Commun., vol. 43, No. 2/3/4, pp. 154–157, Feb./Mar./Apr. 1995.

International Search Report, PCT/US00/23297, Dec. 28, 2000.

Bottomley et al., "A Generalized RAKE Receiver for Interference Suppression," IEEE Journal on Selected Areas in Communications, vol. 18, No. 8, Aug. 2000, pp. 1536–1545.

International Search Report, PCT/US01/49268, Jul. 8, 2002.

* cited by examiner

APPARATUS AND METHODS FOR SELECTIVE CORRELATION TIMING IN RAKE RECEIVERS

BACKGROUND OF THE INVENTION

The present invention relates to communications methods and apparatus, and more particularly, to spread spectrum communications methods and apparatus. Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 typically has allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity. Modern digital wireless systems typically utilize different multiple access techniques such as time division multiple access (TDMA) and/or code division multiple access (CDMA) to provide increased spectral efficiency. In TDMA systems, such as those conforming to the GSM or IS-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

Conventional spread-spectrum CDMA communications systems commonly use so-called "direct sequence" spread spectrum modulation. In direct sequence modulation, a data-modulated carrier is directly modulated by a spreading code or sequence before being amplified by a power amplifier and transmitted over a communications medium, e.g., an air interface. The spreading code typically includes a sequence of "chips" occurring at a chip rate that typically is much higher than the bit rate of the data being transmitted.

In a typical DS-CDMA system, data streams from different users are subjected to various signal processing steps, such as error correction coding or interleaving, and spread using a combination of a user specific spreading code and a group-specific scrambling code. The coded data streams from the users are then combined, subjected to carrier modulation and transmitted as a composite signal in a communications medium.

A RAKE receiver structure is commonly used to recover information corresponding to one of the user data streams. In a typical RAKE receiver, a received composite signal is typically correlated with a particular spreading sequence assigned to the receiver at each of a plurality of correlation times (e.g., delays) to produce a plurality of time-offset correlations, a respective one of which corresponds to an echo of a transmitted spread spectrum signal. The correlations are then combined in a weighted fashion, i.e., respective correlations are multiplied by respective weighting factors and then summed to produce a decision statistic.

The performance of CDMA systems generally is limited by interference among different user signals. Spreading/despreading provides a degree of interference suppression, but the number of users is generally limited by interference.

Conventional RAKE reception techniques generally treat interference as white noise. More recently proposed techniques provide for a degree of interference cancellation through "whitening" of interference. Examples of such techniques are described in "A Noise Whitening Approach to Multiple Access Noise Rejection-Part I: Theory and Background," by Monk et al., *IEEE Journal on Selected Areas in Communications*, vol. 12, pp., 817–827(June 1994); "A Noise Whitening Approach to Multiple Access Noise Rejection-Part II: Implementation Issues," by Monk et al., *IEEE Journal on Selected Areas in Communications*, vol. 14, pp. 1488–1499 (October 1996); "Data Detection Algorithms Specifically Designed for the Downlink of CDMA Mobile Radio Systems," by Klein, 1997 IEEE Vehicular Technology Conference, Phoenix Ariz. (May 4–7, 1997); U.S. Pat. No. 5,572,552 to Dent et al. (issued Nov. 5, 1996); and "Optimizing the Rake Receiver for Demodulation of Downlink CDMA Signals," by Bottomley, *Proceedings of the 43$^{rd}$ IEEE Vehicular Technology Conference*, Secaucus N.J. (May 18–20,1993).

SUMMARY OF THE INVENTION

According to embodiments of the present invention, correlation times are determined from time differentials between times associated with multipath components of a signal based on correlation metrics, preferably signal strength measurements, associated with the multipath components. According to various embodiments of the present invention, selection strategies are employed in which "desired signal collecting" and "interference collecting" correlation times may be selected using average optimal (AO) or instantaneous optimal (IO) selection criteria. These criteria may include, for example, thresholds for signal strengths associated with multipath components of a signal at the correlation times, where the signal strengths may include absolute or relative measures of signal power or signal to noise ratio. According to alternative embodiments, correlation times are selected using an inverse filter of an estimated channel response.

Copending U.S. patent application Ser. Nos. 09/344,898 and 09/344,899, each of which was filed Jun. 25, 1999, describe RAKE-type receivers that utilize interference rejection combining (IRC) or interference whitening (IW) techniques that offer improved performance in the presence of interference. The present invention arises from the realization that performance of these and other RAKE receivers can be improved by judicious selection of the correlation times (delays) that are used in the receiver.

In particular, according to one embodiment of the present invention, respective correlation metrics are generated for respective ones of a plurality of multipath components of a first signal. Respective time-offset correlations of a second signal with a modulation sequence are generated at respective correlation times that are determined from time differentials between times associated with the plurality of multipath components based on the correlation metrics associated with the plurality of multipath components. In preferred embodiments according to the present invention, the first signal is processed to determine respective signal strengths of respective ones of the plurality of multipath components of the first signal. Respective time-offset correlations of the second signal with the modulation sequence are generated at correlation times determined from time differentials between times associated with the plurality of multipath components based on the determined signal strengths of the plurality of multipath components.

According to embodiments of the present invention, a two stage correlation time selection approach is used in which "desired signal collecting" correlation times are used to determine additional "interference collecting" correlation times that can aid in interference canceling or whitening. A first signal is correlated with a modulation sequence at respective ones of a set of first, "desired signal collecting," correlation times to generate respective first correlation outputs. Respective signal strengths are determined for the first correlation outputs. A second, "interference collecting," correlation time is determined based on the determined signal strengths for the first correlation outputs. Respective time-offset correlations of the second signal with the modulation sequence are generated at the first and second correlation times.

According to another aspect of the present invention, selection strategies are used in which the second correlation time is determined from time differentials between the first correlation times based on determined signal strength criteria. One first correlation time of the set of first correlation times that has a signal strength meeting a predetermined criterion is identified. At least one time differential between the identified one first correlation time and at least one other first correlation time of the set of first correlation times is then identified. The second correlation time is determined from the at least one time differential.

In another embodiment of the present invention, respective correlation metrics are determined by generating an estimated channel response from a first signal. An inverse filter of the estimated channel response is then determined, the estimated channel response including respective ones of a plurality of inverse filter coefficients and respective delays associated therewith. Respective time-offset correlation of a second signal with the modulation sequence are generated at respective correlation times selected from the plurality of delays based on the inverse filter coefficients. The estimated channel response may include an instantaneous channel response estimate or an average channel response estimate.

According to yet another aspect of the present invention, a receiver includes a correlation timing determiner, responsive to a received signal, that generates respective correlation metrics for respective ones of a plurality of multipath components of a first signal, respective ones of the plurality of multipath components having respective correlation times associated therewith, and determines a set of correlation times from time differentials between the times associated with the plurality of multipath components based on the correlation metrics. A correlation unit, operatively associated with the correlation timing determiner, generates respective time-offset correlations of a second signal with a modulation sequence at respective correlation times of the selected set of correlation times. A combiner combines the time-offset correlations of the second signal with the modulation sequence to produce an estimate of information represented by the second signal. In one embodiment of the present invention, the correlation timing determiner includes a search correlation unit that generates respective correlation outputs for respective ones of the multipath components. A signal strength determiner determines respective signal strengths of respective ones of the plurality of multipath components of the first signal. A correlation time selector selects the set of correlation times for use in the correlation unit based on the determined signal strengths.

DETAILED DESCRIPTION OF THE DRAWINGS

Figure 1:
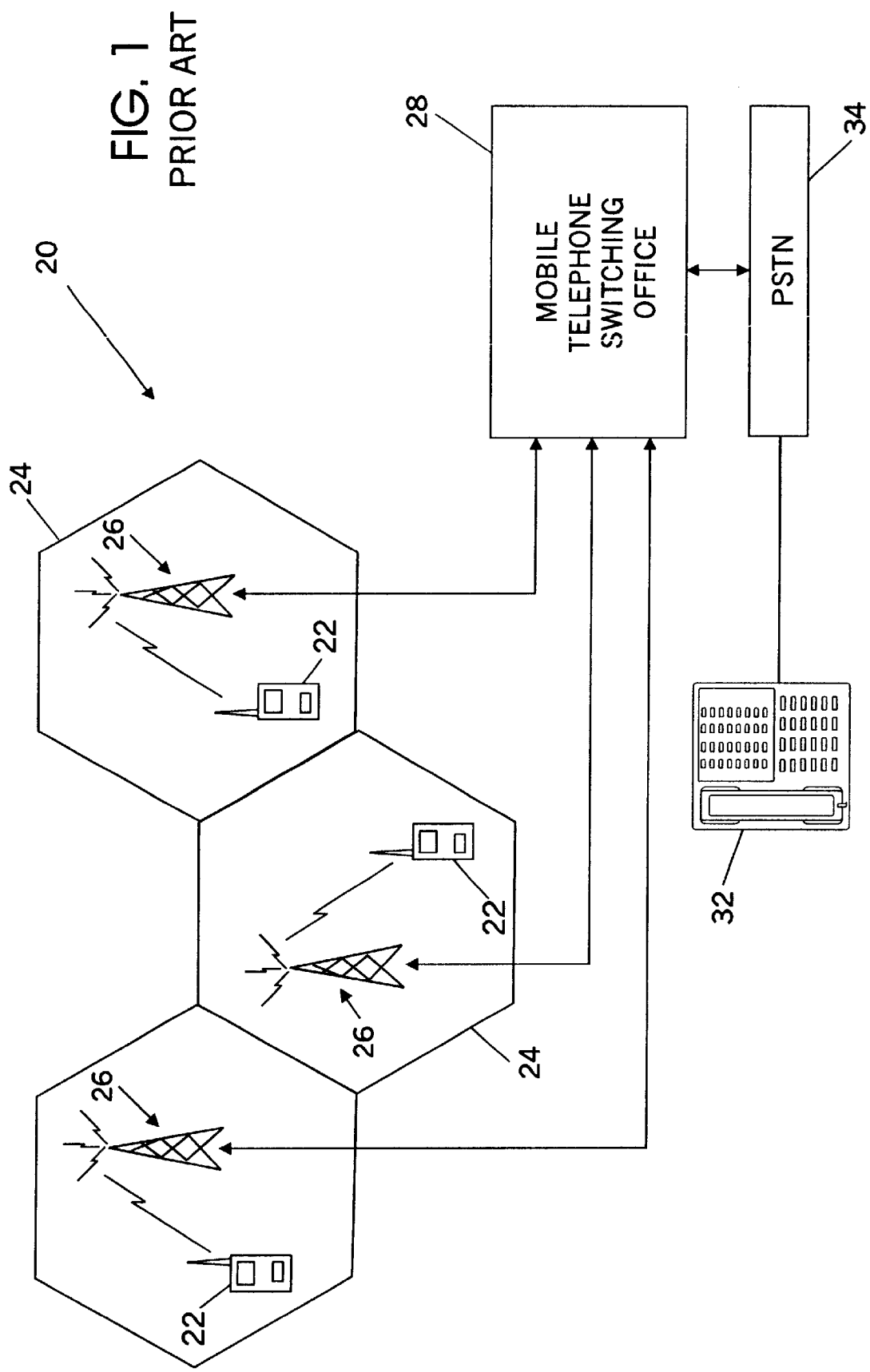
FIG. 1 is a schematic diagram illustrating a conventional terrestrial cellular communications system.
Figure 2:
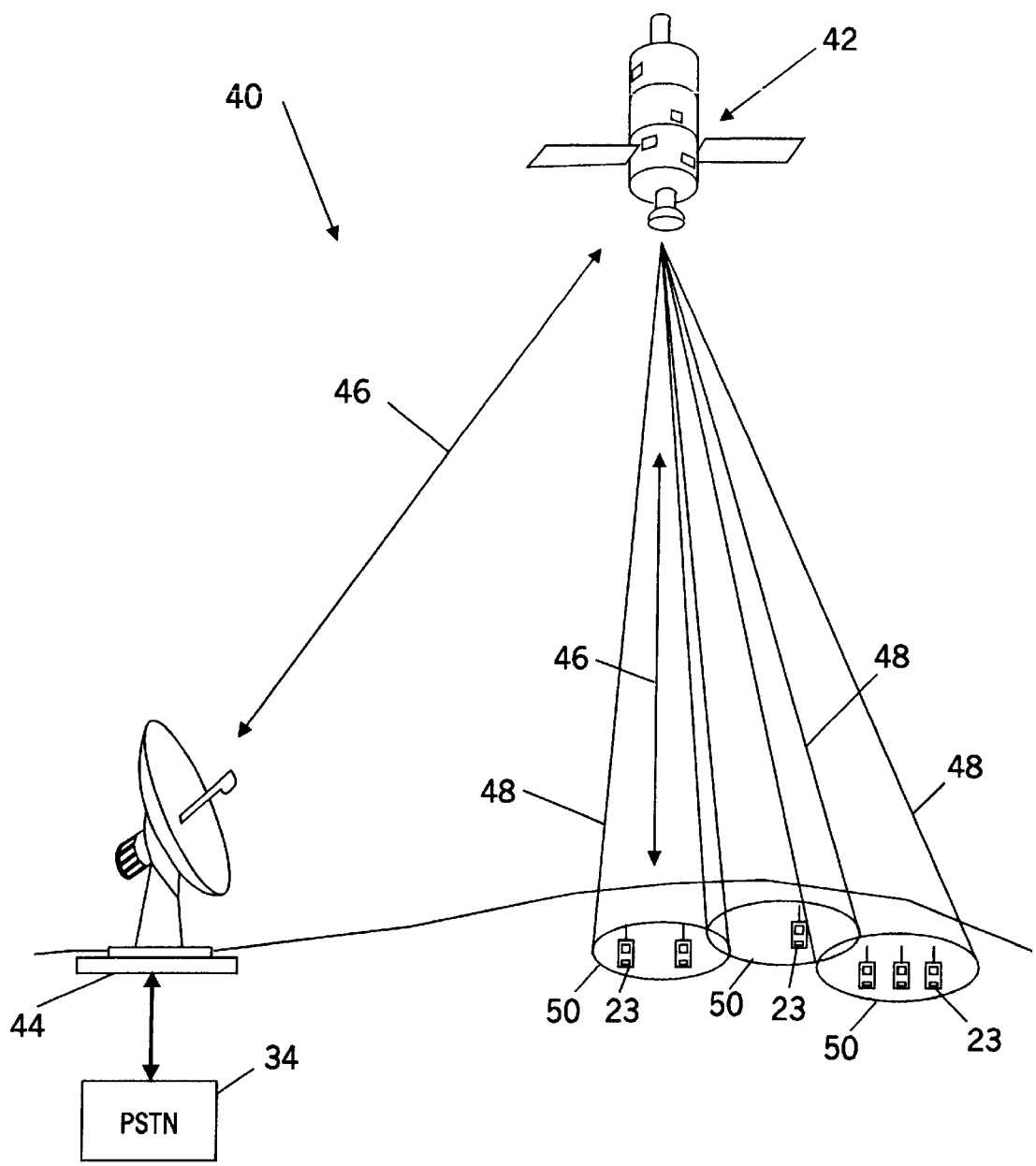
FIG. 2 is a schematic diagram illustrating a conventional satellite based wireless communications system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The discussion herein relates to wireless communications systems, and more particularly, to wireless code division multiple access (CDMA) systems, for example, systems conforming to the IS-95 standards or to proposed standards for wideband CDMA (WCDMA, CDMA2000, and the like). In such wireless communications systems, one or more antennas radiate electromagnetic waveforms generated by a transmitter located, for example, in a mobile terminal or base station. The waveforms are propagated in a radio propagation environment, and are received by a receiver via one or more antennas. It will be understood that although the description herein refers to a radio environment, apparatus and methods are applicable to other environments, such as wireline communications and recovery of data from magnetic storage media.

Figure 3:
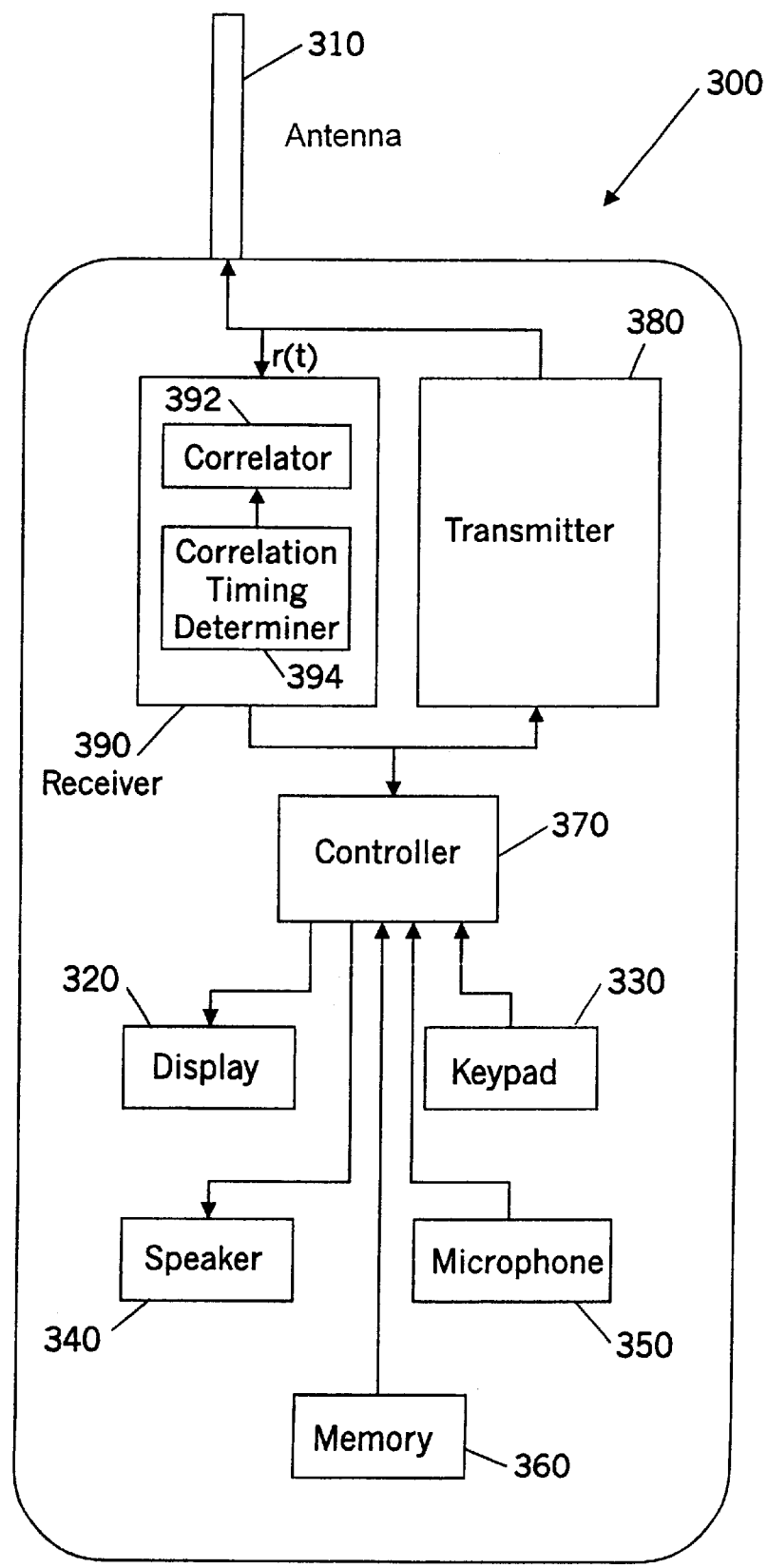
FIG. 3 is a schematic diagram illustrating a wireless terminal according to an embodiment of the present invention.

FIG. 3 illustrates an exemplary wireless terminal 300, e.g., a terminal for use in a wireless CDMA communications system, according to one embodiment of the present invention. The terminal 300 includes a controller 370, such as a microprocessor, microcontroller or similar data processing device, that executes program instructions stored in a memory 360, such as a dynamic random access memory (DRAM), electrically erasable programmable read only memory (EEPROM) or other storage device. The controller 370 is operatively associated with user interface components such as a display 320, keypad 330, speaker 340, and microphone 350, operations of which are known to those of skill in the art and will not be further discussed herein. The controller 370 also controls and/or monitors operations of a radio transmitter 380 that, for example, transmits radio frequency (RF) signals in a communications medium via an antenna 310.

The controller 370 is also operatively associated with a receiver 390. The receiver includes a correlation unit 392 that is operative correlate a signal r(t) received via the antenna 310 with a particular modulation sequence, for example, a scrambling or spreading sequence. As described herein, the correlation unit 392 performs these correlations at correlation times, (e.g., delays), that are determined by a correlation timing determiner 394 based on respective metrics for respective multipath components of a received signal, more preferably, based on signal strength measurements, such as average or instantaneous signal power or signal to noise ratio measurements. Detailed discussion of examples of such correlation time selection operations is provided herein.

It will be appreciated that the receiver 390 and other components of the terminal 300 may be implemented using a variety of hardware and software. For example, portions of the receiver 390, including the correlation unit 392 and correlation timing determiner 394, may be implemented using special-purpose hardware, such as an application specific integrated circuit (ASIC) and programmable logic devices such as gate arrays, and/or software or firmware running on a computing device such as a microprocessor, microcontroller or digital signal processor (DSP). It also will be appreciated that although functions of the receiver 390 may be integrated in a single device, such as a single ASIC, they may also be distributed among several devices.

Figure 4:
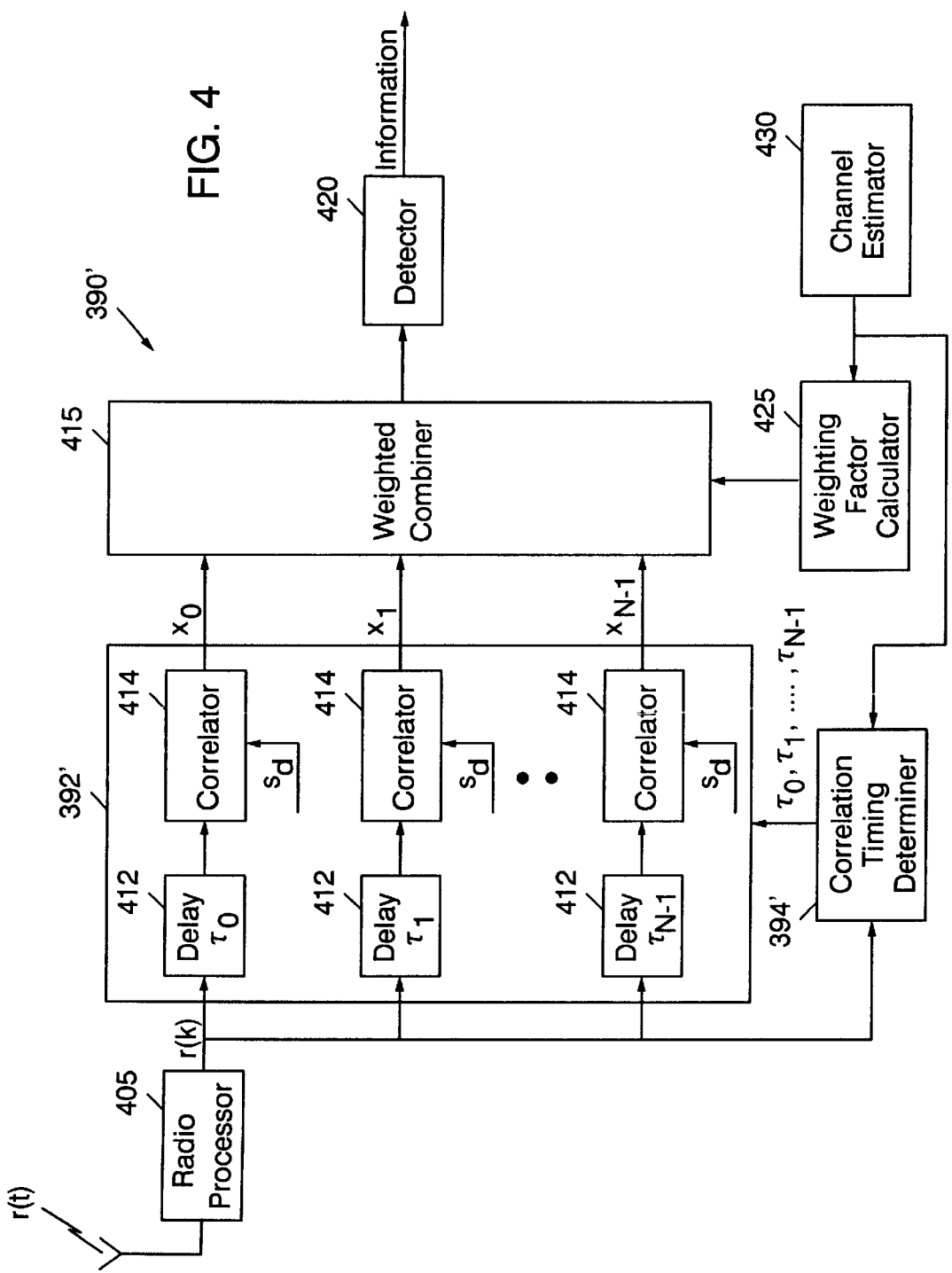
FIG. 4 is a schematic diagram illustrating an interference rejection combining (IRC) RAKE receiver according to an embodiment of the present invention.

FIG. 4 illustrates a correlation receiver 390' according to one embodiment of the present invention, in particular, an interference rejection combining (IRC) RAKE receiver as described in the aforementioned U.S. patent application Ser. No. 09/344,899 to Wang et. al., filed Jun. 25, 1999, and in U.S. patent application Ser. No. 09/165,647 to Bottomley, filed Oct. 2, 1998, each of which is assigned to the assignee of the present invention and incorporated by reference herein in its entirety. The receiver 390' recovers information represented by a spread spectrum signal transmitted according to a desired spreading sequence $s_d$ from a composite signal r(t) received from a communications medium. The receiver 390' includes means for receiving the composite signal r(t), for example, a radio processor 405 that performs such operations as amplifying the signal r(t), mixing, filtering and producing baseband samples r(k) of the received signal r(t). It will be appreciated that the radio processor 405 may perform a variety of other functions as well.

A correlation unit 392', here shown as a bank of delays 412 linked to a bank of correlators 414, correlates delayed versions of the baseband signal r(k) to the desired spreading sequence $s_d$ at N correlation times $\tau_0, \tau_1, \ldots, \tau_{N-1}$. The correlation times $\tau_0, \tau_1, \ldots, \tau_{N-1}$ are determined by a correlation timing determiner 394', responsive to the baseband signal r(k) and to a channel estimate produced by a channel estimator 430. It will be appreciated that the correlation unit 392' may be implemented in various other forms, for example, by using a sliding correlator. The correlation timing determiner 394' preferably determines the correlation times $\tau_0, \tau_1, \ldots, \tau_{N-1}$ based on signal strength measurements, such as measurements of absolute signal power, relative signal power, or signal to noise ratio, made on multipath components of the baseband signal r(k), using one of a plurality of average optimum (AO) or instantaneous optimum (IO) correlation time selection strategies, as explained in detail below.

The correlations $x_0, x_1, \ldots, x_{N-1}$ produced by the correlation unit 392' are combined in a weighted combiner 415 that uses weighting factors generated by a weighting factor generator 425 based on a channel estimate provided by the channel estimator 430, as well as on such information as the statistical properties of the desired spreading sequence $s_d$, and information about power of other spread spectrum signals included in the composite signal r(t). The weighted combiner 425 produces a decision statistic that may then be used by a detector 420 to estimate information represented by the originally transmitted spread spectrum signal corresponding to the desired spreading sequence $s_d$. The detector 420 may, for example, employ soft decision decoding, such as convolutional or turbo decoding.

It will be appreciated that the receiver 390' of FIG. 4 may be implemented in a number of different ways. Although the description herein refers to employment of the receiver 390' in a mobile or other terminal that is operative to communicate with a base station of a wireless communications system, the receiver 390' can be implemented in a number of other forms including, but not limited to, receivers used in cellular base station transceivers, satellite transceivers, wireline transceivers, and other communications devices. The correlation unit 392', correlation timing determiner 394', weighted combiner 415, weighting factor generator 425, detector 440 and other components of the receiver 390' may be implemented using, for example, an application-specific integrated circuit (ASIC), digital signal processor (DSP) chip or other processing device configured to perform the described processing functions. It will also be understood that, in general, components of the receiver 390' may be implemented using special-purpose circuitry, software or firmware executing on special or general-purpose data processing devices, or combinations thereof.

Figure 5:
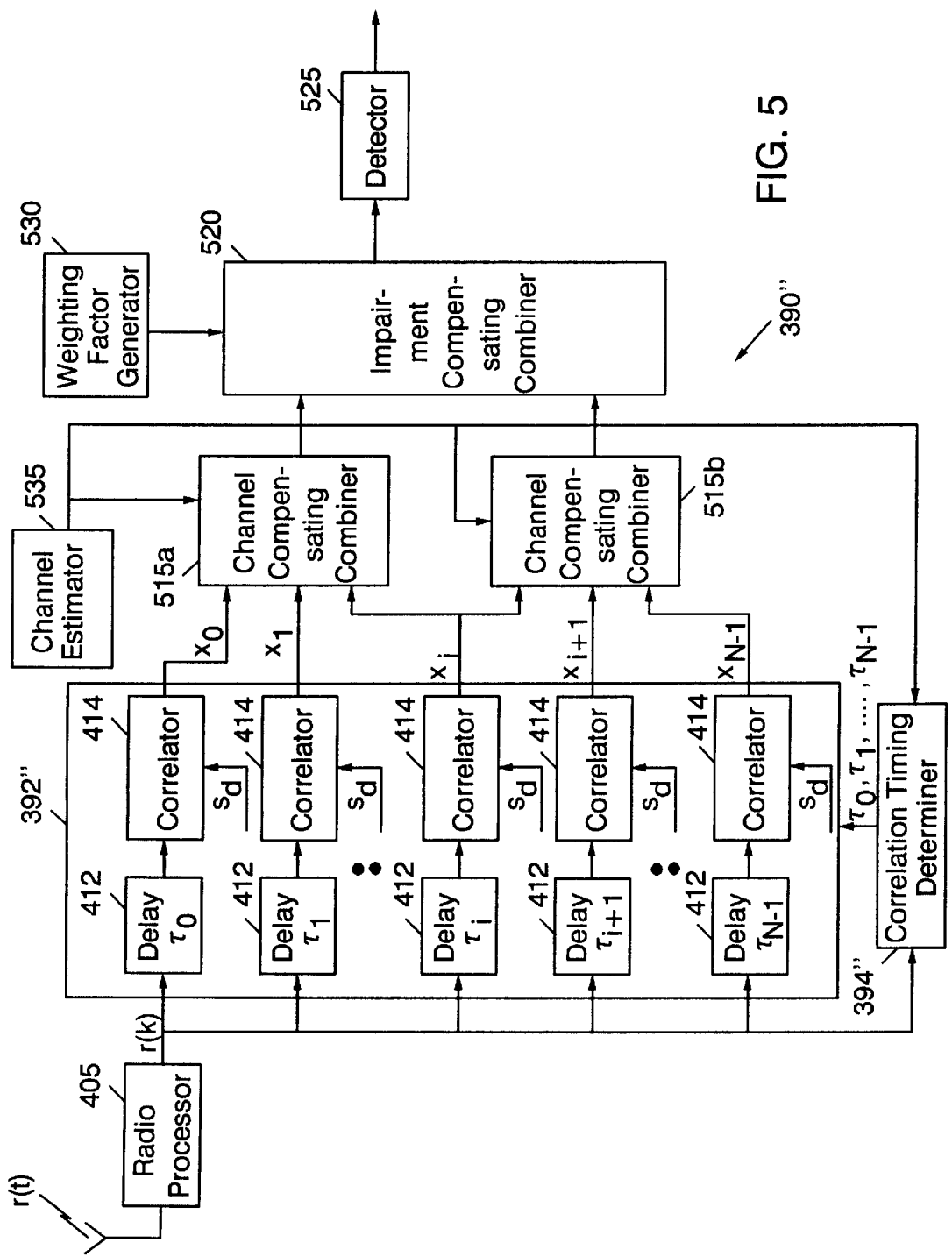
FIG. 5 is a schematic diagram illustrating an interference whitening (IW) RAKE receiver according to the present invention.

FIG. 5 illustrates a receiver 390" according to another embodiment of the present invention, more particularly, a multistage interference whitening (IW) RAKE receiver as described in the aforementioned U.S. patent application Ser. No. 09/344,898 to Bottomley et. al, filed Jun. 25, 1999, and incorporated by reference herein in its entirety. The receiver 390" recovers information represented by a spread spectrum signal transmitted according to a desired spreading sequence $s_d$ from a composite signal r(t) received from a communications medium. The receiver 390" includes means for receiving the composite signal r(t), for example, a radio processor 405 that performs such operations for example, as amplifying the signal r(t), mixing, filtering and producing baseband samples r(k) of the received signal r(t). It will be appreciated that the radio processor 405 may perform a variety of other functions as well.

A correlation unit 392", here shown as a bank of delays 412 linked to a bank of correlators 414, correlates delayed versions of the baseband signal r(k) to the desired spreading sequence $s_d$ at correlation times $\tau_0, \tau_1, \ldots, \tau_{N-1}$. The correlation times $\tau_0, \tau_1, \ldots, \tau_{N-1}$ are determined by a correlation timing determiner 394" responsive to the baseband signal r(k) and to a channel estimate produced by a channel estimator 535. The correlation unit 392" may be implemented in many other forms, such as by using a sliding correlator. The correlation timing determiner 394" preferably determines the correlation times $\tau_0, \tau_1, \ldots, \tau_{N-1}$ based on signal strength measurements on multipath components of the baseband signal r(k). More preferably, the correlation times $\tau_0, \tau_1, \ldots, \tau_{N-1}$ for the embodiment of FIG. 5 are selected using an average optimal correlation time selection strategy that selects correlation "slides", i.e., sets of correlation times that are offset from one another, as is described in detail below.

Respective first and second groups of correlations $x_0-x_i$, $x_i-x_{N-1}$ produced by the correlation unit 392" are combined in respective first and second combiners 515a, 515b, here shown as channel compensating combiners that combine the correlations according to channel coefficients estimated by the channel estimator 535. As used herein, "channel compensating" combining generally refers to combining operations that include the use of channel coefficients, including, but not limited to, operations that match a channel response. It will be appreciated that the channel estimator 535 may estimate channel coefficients in a number of different ways, for example, by estimation from pilot symbols (e.g., in a pilot or other channel) or recovered data symbols. Such techniques are known to those skilled in the art and will not be described in further detail herein.

A respective group of correlations provided to a respective one of the first and second combiners 515a, 515b are produced by correlation with a respective set of correlation times $\{\tau_0, \tau_1, \ldots, \tau_i\}, \{\tau_i, \tau_{i+1}, \ldots, \tau_{N-1}\}$. The correlation time sets $\{\tau_0, \tau_1, \ldots, \tau_i\}, \{\tau_i, \tau_{i+1}, \ldots, \tau_{N-1}\}$. (or "slides") share the same spacing between constituent elements, e.g., $|\tau_1-\tau_0|=|\tau_{i+1}-\tau_i|$ and $|\tau_i-\tau_1|=|\tau_{N-1}-\tau_{i+1}|$, but are offset from one another by a time interval. For the illustrated embodiment of FIG. 5, the offset time interval is equal to $\tau_i$, such that the first and second channel compensating combiners 515a, 515b share the correlation output $x_i$. However, the offset time interval need not be so constrained; the sets of correlation times or slides may be offset such that no correlation time is shared between the respective sets of correlation times associated with respective ones of the first stage combiners 515a, 515b.

First and second combined values produced by the first and second combiners 515a, 515b are combined in a third combiner 520, here shown as an impairment compensating combiner that combines the first and second combined values according to weighting factors generated by a weighting factor generator 530. The weighting factor generator 530 may generate the weighting factors in a number of different ways, including by explicit calculation from an estimated composite channel response and an estimated impairment correlation, or by adaptive filtering techniques. The third combiner 530 produces a decision statistic that may be used by a detector 525 to estimate information represented by the originally transmitted spread spectrum signal corresponding to the desired spreading sequence $s_d$. The detector 525 may, for example, implement soft decision decoding, such as convolutional decoding or turbo decoding.

It will be appreciated that the receiver 390" of FIG. 5 may be implemented in a number of different ways. Although the description herein refers to employment of the receiver 390" in a mobile or other terminal that is operative to communicate with a base station of a wireless communications system, the receiver 390" can be implemented in a number of other forms including, but not limited to, receivers used in cellular base station transceivers, satellite transceivers, wireline transceivers, and other communications devices. The correlation unit 392", correlation timing determiner 394", combiners 515a, 515b, 520, channel estimator 535, weighting factor generator 530, detector 525 and other components of the receiver 390" may be implemented using, for example, an application-specific integrated circuit (ASIC), digital signal processor (DSP) chip or other processing device configured to perform the described processing functions. It will also be understood that, in general, components of the receiver 390" may be implemented using special-purpose circuitry, software or firmware executing on special or general-purpose data processing devices, or combinations thereof.

Figure 6:
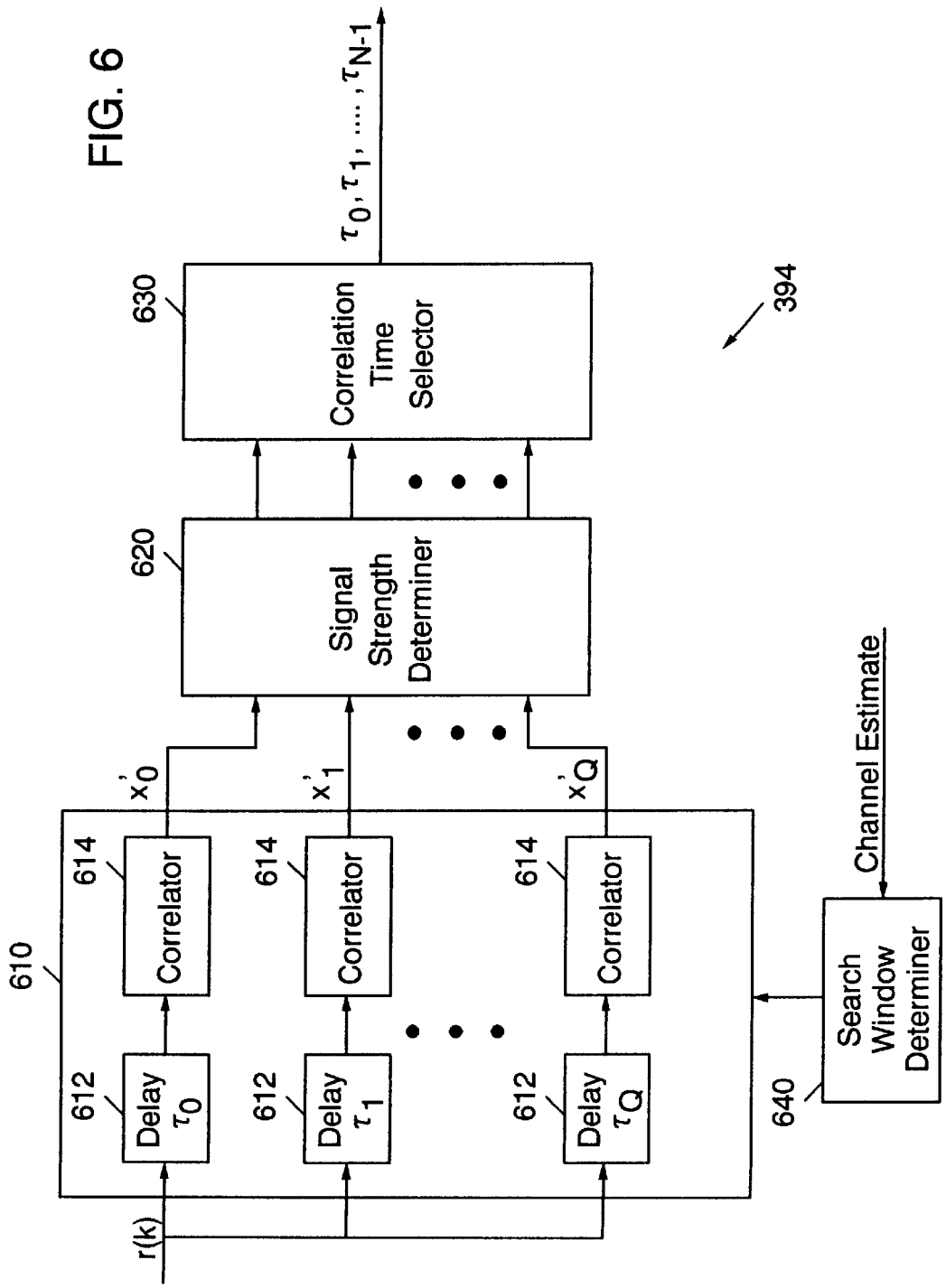
FIG. 6 is a schematic diagram illustrating a correlation timing determiner according to an embodiment of the present invention.

FIG. 6 illustrates a correlation timing determiner 394 according to an embodiment of the present invention. The correlation timing determiner 394 includes a search correlation unit 610 that performs respective correlations of a baseband signal r(k) with a desired modulation sequence $s_d$ at respective ones of a plurality of correlation times $\tau_0$, $\tau_1, \ldots, \tau_Q$ within a search window defined by a search window determiner 640. The search window determiner 640 may determine the correlation times $\tau_0, \tau_1, \ldots, \tau_Q$ using, for example, a channel estimate produced by a channel estimator, such as the channel estimators 430, 535 of FIGS. 4 and 5. The search correlation unit produces a plurality of correlation outputs $x_0', x_1', \ldots, x_Q'$ corresponding to a plurality of multipath components of the baseband signal r(k). The correlation outputs $x_0', x_1', \ldots, x_Q'$ are processed by a signal strength determiner 620 that determines respective signal strengths for respective ones of the multipath components of the baseband signal r(k). The determined signal strengths are used by a correlation time selector 630 to determine the particular correlation times that will be used in the correlation unit of the associated receiver, such as the correlation units 392', 392" of FIGS. 4 and 5. Detailed discussion of exemplary operations of such a correlation timing determiner 394 follows.

Instantaneous Optimal and Average Optimal Correlation Time Selection

The present invention arises from the realization that correlation times used in a RAKE receiver, e.g. the delays used in the correlation units 392', 392" in the IRC-RAKE receiver 390' of FIG. 4 and the IW-RAKE receiver 390" of FIG. 5, may be optimally chosen using signal strength measurements of multipath components of a signal. Practical strategies described herein may be classified into two categories, instantaneous optimum (IO) and average optimum (AO). The IO strategies preferably assign correlation times (finger locations) of the RAKE receiver based on instantaneous channel characteristics, such that the correlation times are updated at a rate on the order of the rate at which fading occurs in the channel. The AO strategies assign fingers based on average channel characteristics, implying that, under such an AO strategy, correlation times may be updated more slowly than under IO strategies.

Figure 7:
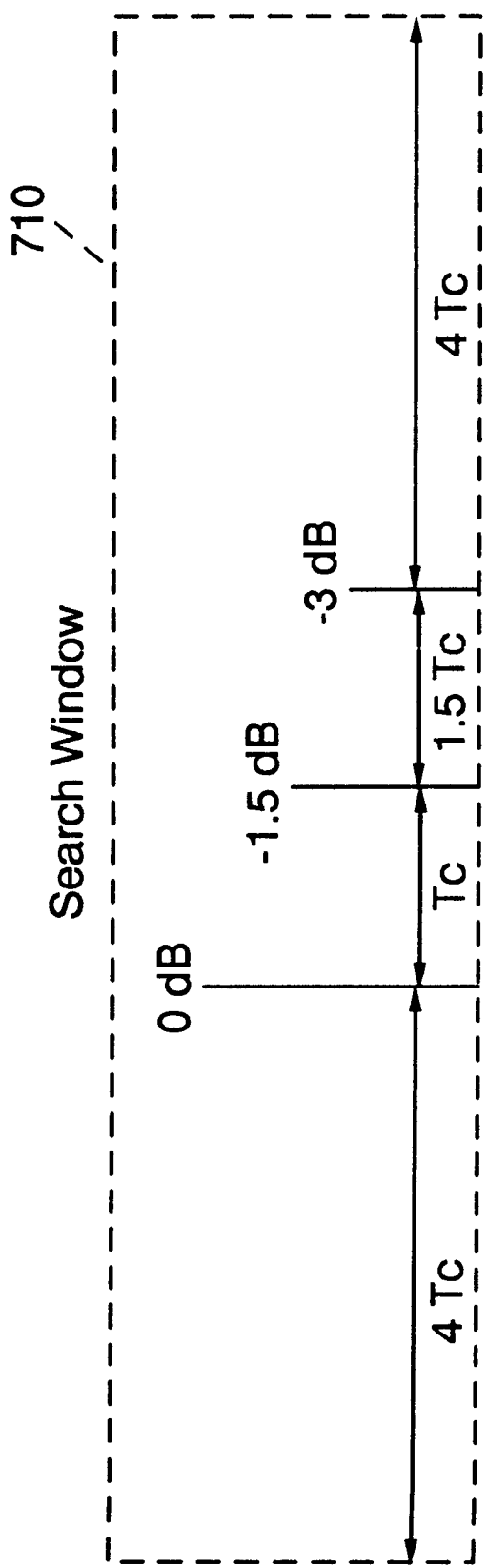
FIG. 7 is a diagram illustrating an exemplary correlation search window and channel model.
Figure 8:
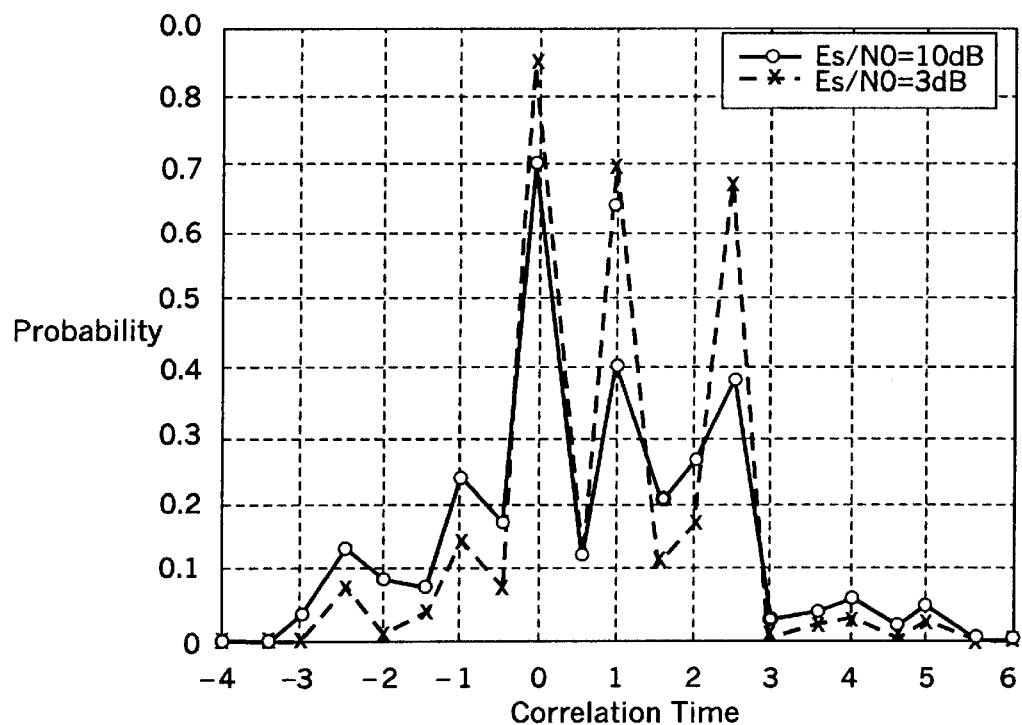
FIGS. 8–11 are histograms illustrating exemplary signal probabilities for IRC-RAKE and IW-RAKE receivers.
Figure 9:
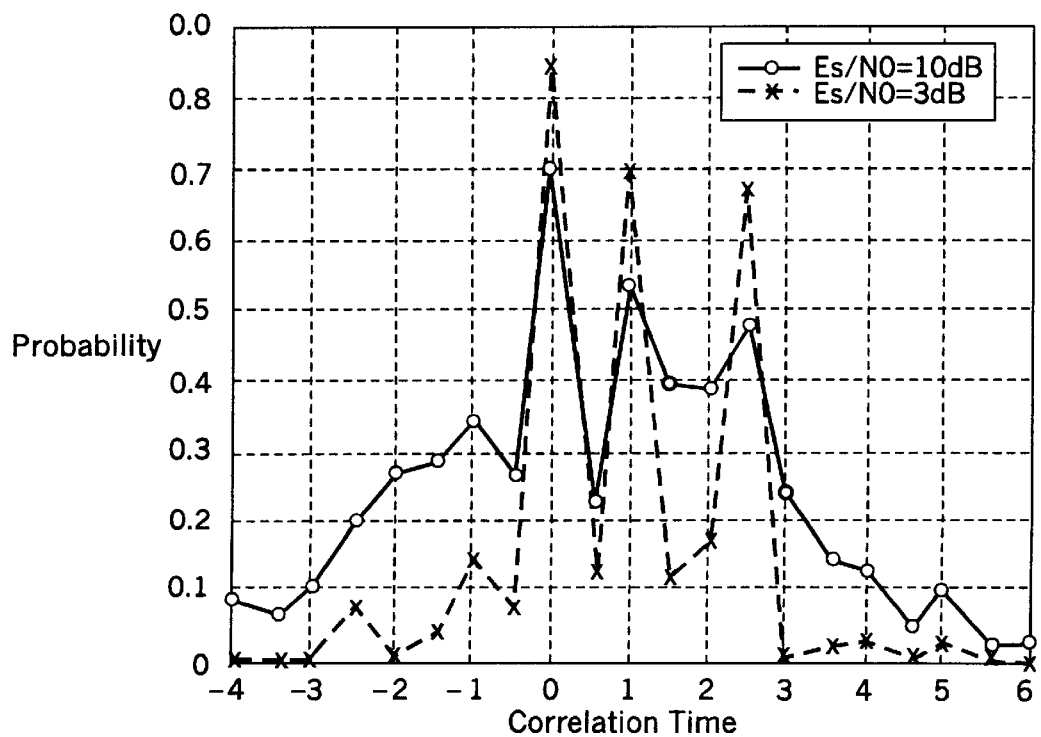

FIG. 7 illustrates an exemplary search window 710, including exemplary channel response coefficients of magnitude 0 dB, −1.5 dB and −3 dB, at times 0, $T_c$, and $2.5T_c$, respectively, where $T_c$ is the modulation chip period. FIGS. 8–9 are simulation histograms that illustrate respective probabilities of respective optimal correlation times in selecting three (FIG. 8) or five (FIG. 9) correlation times for an IRC-RAKE receiver for K=24 orthogonal in-cell users and a spreading factor N=32 at signal to noise ratios $$\frac{E_b}{N_0}$$

of 3 dB and 10 dB, based on a "brute force" search. As shown in FIGS. 8 and 9, the most likely optimal correlation times are the correlation times associated with the channel coefficients of FIG. 7. It is believed that fingers placed at these correlation times predominantly collect energy associated with the desired signal, while fingers placed at other correlation times primarily collect energy associated with interfering signals. Fingers associated with the desired signal appear to be more significant at low signal to noise ratio $$\frac{E_b}{N_0},$$

while the fingers associated with interference suppression increase in significance at higher signal to noise ratio $$\frac{E_b}{N_0}.$$

Figure 10:
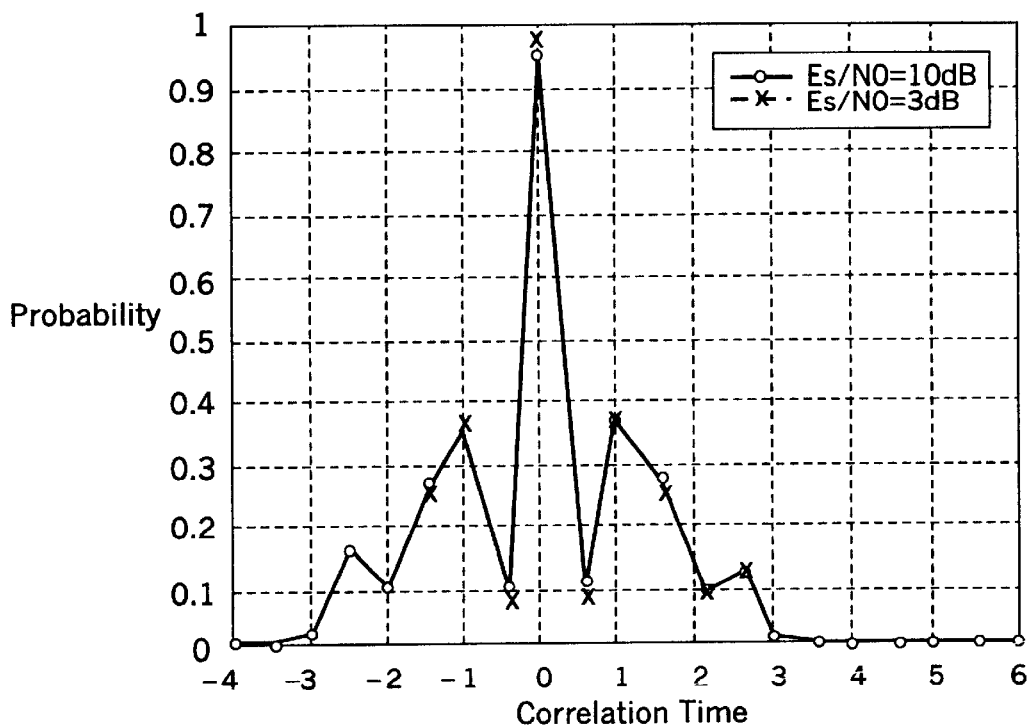
Figure 11:
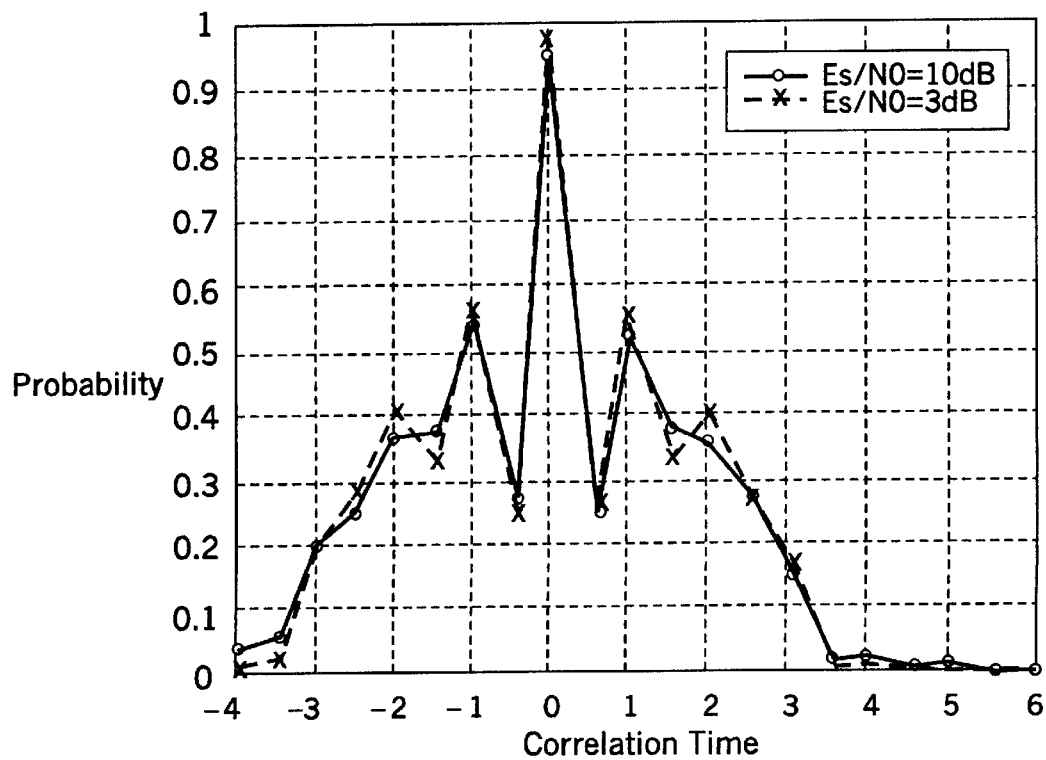

FIGS. 10 and 11 are simulation histograms that illustrate respective probabilities of respective optimal slides (correlation time sets) for a three-slide (FIG. 10) or a five-slide (FIG. 11) IW-RAKE receiver for K=24 orthogonal in-cell users and a spreading factor N=32 at signal to noise ratios $$\frac{E_b}{N_0}$$

of 3 dB and 10 dB. Here, the most probable slide is at "zero delay slide", with significant probabilities also being associated with slides at $\pm T_c$.

From FIGS. 8–11, it may be concluded that instantaneous channel measurements may be used to determine a set of optimal correlation times at the rate at which the channel changes, for example, by selecting a new set of correlation times each time a new channel estimate is generated. Such an approach may be referred to as instantaneous optimal (IO). However, a more practical solution may be to determine a set of optimum correlation times based on average measurements over a more extended period, such that new correlation times are determined at a rate much less than the fading rate of the channel. Such an approach may be referred to as average optimum (AO).

Table 1 illustrates exemplary average optimal correlation times for IRC-RAKE and IW-RAKE receivers having various numbers of fingers and assuming the channel model shown in FIG. 7:

TABLE I

| Receiver Type | Number of Correlation Times | Optimal Correlation Times (or Slides) |
| --- | --- | --- |
| IRC | 3 | 0, $T_c$, $2.5T_c$ |
| IRC | 4 | $-T_c$, 0, $T_c$, $2.5T_c$ |
| IRC | 5 | $-T_c$, 0, $T_c$, $2.5T_c$, $3.5T_c$ |
| IW | 3 | $-T_c$, 0, $T_c$ |
| IW | 4 | $-T_c$, 0, $T_c$, $2T_c$ |
| IW | 5 | $-2T_c$, $-T_c$, 0, $T_c$, $2T_c$ |

As can be seen from Table I, for an IRC-RAKE receiver with a number of correlation times (fingers) greater than 3, "extra" interference-related fingers may be placed at $-T_c$ and $3.5\ T_c$. For an IW-RAKE receiver, extra correlation slides may include $\pm T_c$ and $\pm 2T_c$.

Table II illustrates exemplary average optimal finger locations for an 5-finger IRC-RAKE receiver for signals having multipath components of various magnitudes:

TABLE II

| Case | Multipath | Corresponding Multipath Strength | Optimal Correlation Times |
| --- | --- | --- | --- |
| 1 | 0, $T_c$ | 0, −3 dB | −2$T_c$, −$T_c$, 0, $T_c$, 2$T_c$ |
| 2 | 0, 1.5 $T_c$ | 0, −3 dB | −3$T_c$, −1.5$T_c$, 0, 1.5$T_c$, 3$T_c$ |
| 3 | 0, $T_c$, 2.5$T_c$ | 0, −3 dB, −1.5 dB | −$T_c$, 0, $T_c$, 2.5$T_c$, 3.5$T_c$ |
| 4 | 0, $T_c$, 2.5$T_c$ | −1.5 dB, 0 dB, −3 dB | −$T_c$, 0, $T_c$, 2.5$T_c$, 3.5$T_c$ |
| 5 | 0, $T_c$, 2.5$T_c$ | 0, −1.5 dB, −3 dB | −$T_c$, 0, $T_c$, 2.5$T_c$, 3.5$T_c$ |
| 6 | 0, $T_c$, 2.5$T_c$ | 0, −1.5 dB, −6 dB | −$T_c$, 0, $T_c$, 2.5$T_c$, 3$T_c$ |
| 7 | 0, $T_c$, 2.5$T_c$ | 0, −1.5 dB, −9 dB | −$T_c$, 0, $T_c$, 2$T_c$, 2.5$T_c$ |

Correlation Time Selection Strategies

According to aspects of the present invention, selection strategies based on signal strength measurements are used to select correlation times (e.g., signal delays) that can enhance detection of a desired signal and detection of interference (colored interference) that can be removed using interference cancellation or whitening techniques, such as those used in the IRC-RAKE and IW-RAKE receivers described above. Generally, these selection strategies have the following characteristics:

1. "Desired signal collecting" correlation times, i.e., correlation times at which fingers are most likely to collect energy from a desired signal, are identified, preferably by identifying correlation times at which correlations of a received signal have energy exceeding a predetermined threshold; and
2. "Interference collecting" correlation times, i.e., correlation times at which fingers are most likely to collect energy from interfering signals, are identified, preferably from time differentials between selected desired signal collecting correlation times that are selected based on signal strength criteria.

Typically, a receiver is operated using a limited number of correlation times. Accordingly, desired signal collecting correlation times are preferably assigned first, with remaining available fingers in the receiver being assigned to interference collecting correlation times.

Five correlation time selection strategies described herein may be implemented using apparatus such as the apparatus described in FIGS. 4–6. In particular, first, second, third, and fourth correlation time selection strategies described herein are preferably used with an IRC-RAKE receiver, such as the receiver 390' illustrated in FIG. 4, while a fifth correlation time selection strategy described herein is preferably used with an IW-RAKE receiver, such as the receiver 390" of FIG. 5. These strategies may be implemented using apparatus such as the correlation time determiners 394, 394', 394" illustrated in FIGS. 4–6.

A first correlation time selection strategy, according to an embodiment of the present invention, uses an average optimal approach to select correlation times for an IRC RAKE receiver, such as the receiver 390' of FIG. 4. According to this first strategy:

1. Respective average signal strengths are determined for respective ones of a plurality of correlation outputs produced by a search correlation unit, such as the search correlation unit 610 of FIG. 6, at respective correlation times in a search window.
2. A set of L correlation times $\tau_0, \ldots, \tau_{L-1}$ having corresponding determined average signal strengths greater than a first threshold are identified based on the signal strength measurements, where $\tau_0, \ldots, \tau_{L-1}$ is a series of increasing delays. These may be viewed as the "desired signal collecting" correlation times. In selecting the set of L correlation times, other criteria may also be applied, e.g., a minimum separation criteria could be used such that if two correlation times are separated by a time interval that is less than a predetermined threshold, only one of the times will be selected for inclusion in the set of L correlation times.
3. A subset of the set of L correlation times is then identified, the subset including M correlation times $\tau_0, \ldots, \tau_{M-1}$ for which the corresponding average signal strength is greater than a second threshold that is greater than the first threshold, where a correlation time $\tau_J$ has the greatest corresponding signal strength and $\tau_0, \ldots, \tau_{M-1}$ is series of increasing delays.
4. Respective time differentials $\Delta_1, \ldots, \Delta_{M-1}$ between the "strongest" correlation time $\tau_J$ and respective other ones of the correlation times in the subset of M correlation times are determined, where $\Delta_1, \ldots, \Delta_{M-1}$ is a series of time differentials of increasing magnitude.
5. "Extra" correlation times, which may be viewed as "interference collecting" correlation times, are determined from the time differentials $\Delta_1, \ldots, \Delta_{M-1}$, beginning with a correlation time $\hat{\tau}_0$, according to the relationship:

$$\{\hat{\tau}_0, \hat{\tau}_1, \ldots\} = \{\tau_0 - \Delta_1, \tau_{M-1} + \Delta_1, \tau_0 - 2\Delta_1, \tau_{M-1} + 2\Delta_1, \ldots\},$$

where determined correlation times that are the same as, or sufficiently near, correlation times already determined are excluded.

6. The desired signal collecting and interference collecting correlation times are used in the IRC-RAKE receiver.

Figure 12A:
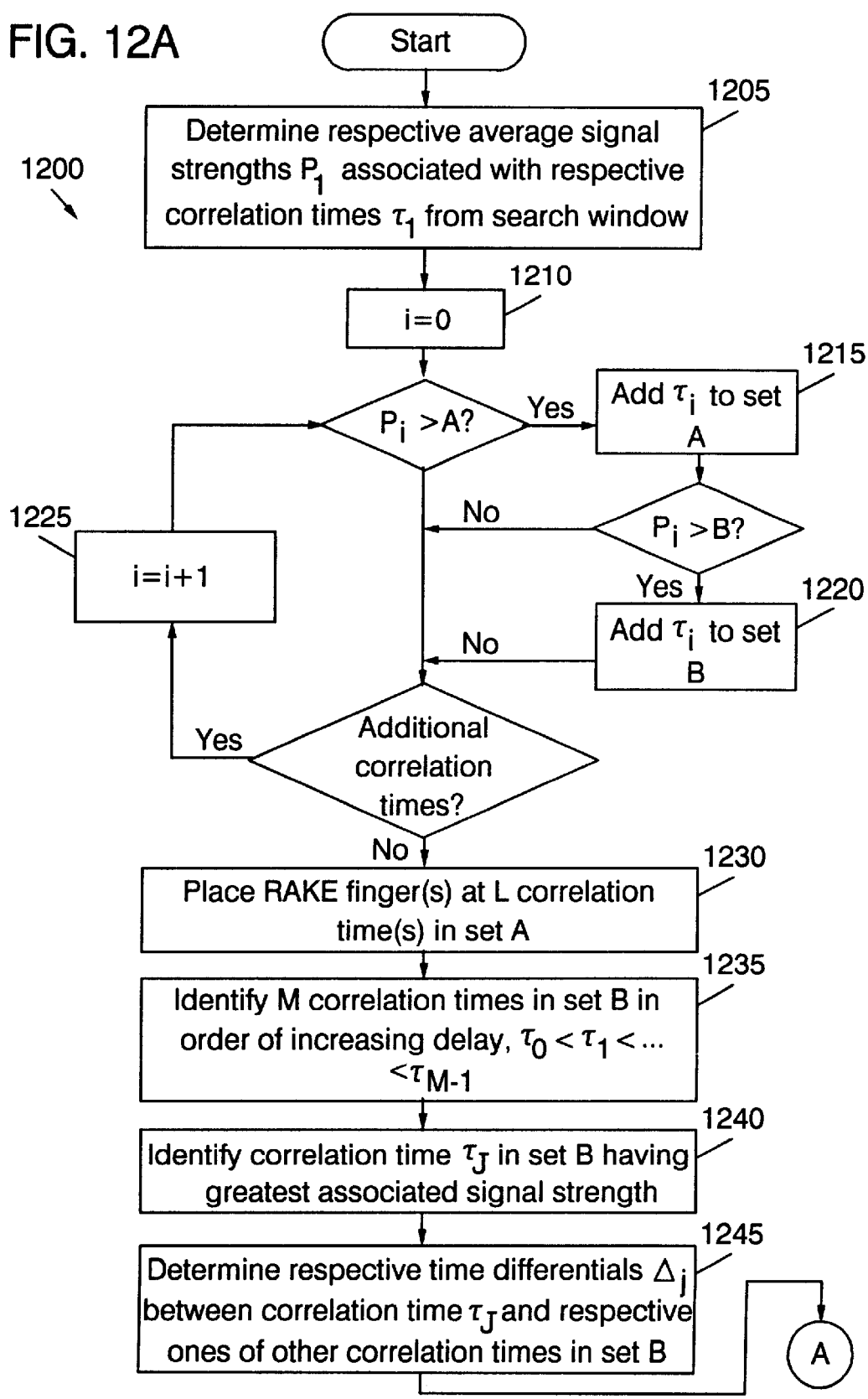
FIGS. 12A–12B illustrate exemplary operations of a first correlation time selection strategy according to an embodiment of the present invention.
Figure 12B:
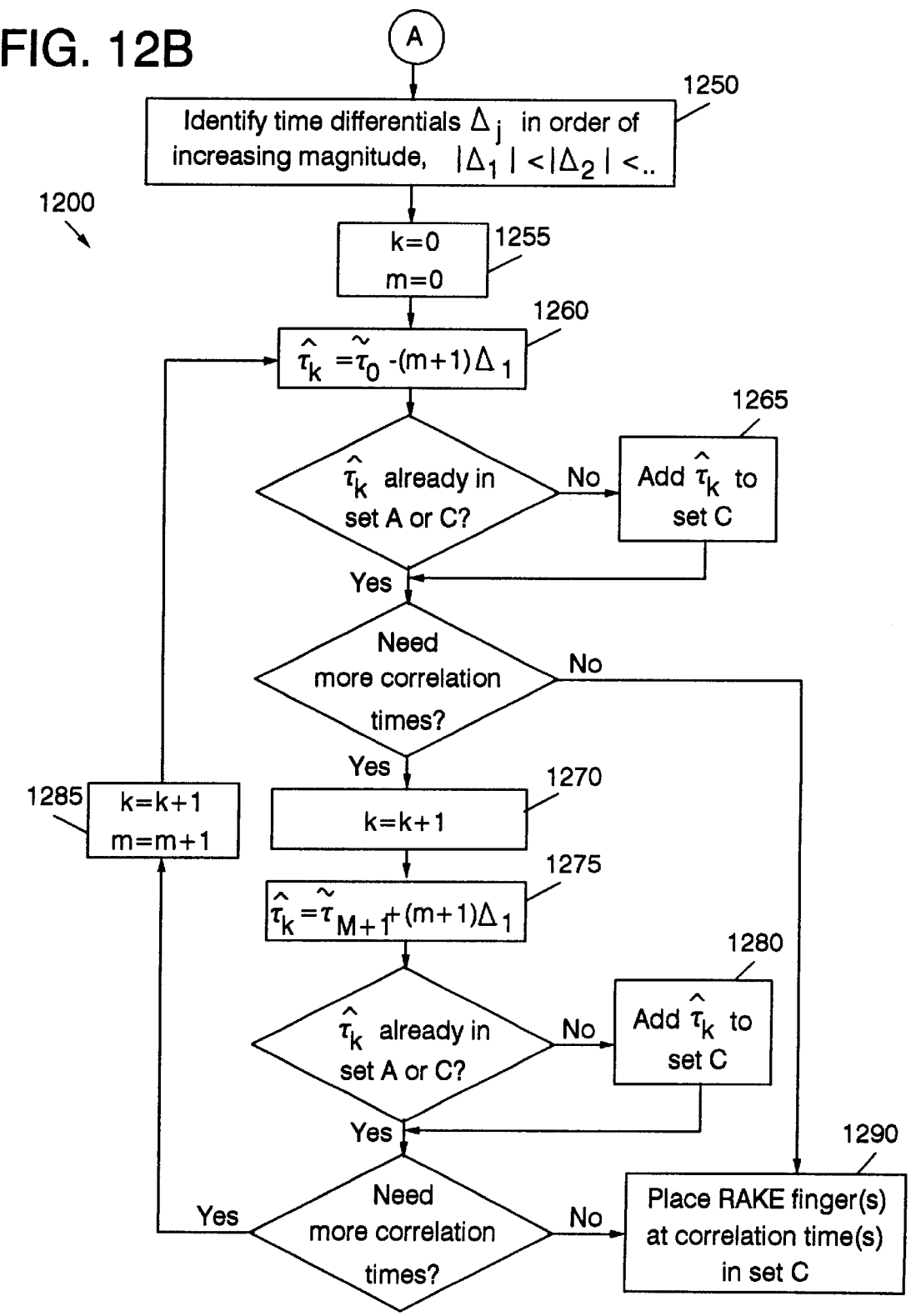

FIGS. 12A–12B illustrate exemplary operations 1200 for implementing this first selection strategy. Respective average signal strengths $P_i$ associated with a set of correlation times $\tau_i$ in a search window are determined (Block 1205). An iteration variable i is set to zero (Block 1210), and a loop is entered in which the signal strengths $P_i$ are examined to see if they meet predetermined criteria. If the signal strength $P_i$ associated with a particular correlation time $\tau_i$ is greater than a first threshold A, the correlation time $\tau_i$ is added to a first set A (Block 1215). Each correlation time $\tau_i$ added to set A is also tested to see if the corresponding signal strength $P_i$ exceeds a second, higher threshold B. If it does, the correlation time $\tau_i$ is also added to a second set B (Block 1220). The iteration variable i is incremented (Block 1225), and next correlation value $\tau_i$ tested.

The correlation times in the first set A are sent to the RAKE receiver (Block 1230), as they represent the desired signal collecting correlation times. The M correlation times $\tau_0, \tau_1, \ldots, \tau_{M-1}$ in set B are identified in order of increasing delay (Block 1235), and a correlation time $\tau_J$ having the greatest corresponding signal strength is identified (Block 1240). Respective time differentials $\Delta_j$ between the correlation time $\tau_J$ and respective other correlation times of set B are then determined (Block 1245), and identified in order of increasing delay $|\Delta_1| < |\Delta_2| < \ldots$ (Block 1250).

Iteration variables k and m are then set to zero (Block 1255), and a second loop for identifying interference collecting correlation times is entered. A first candidate correlation time $\hat{\tau}_k$ is computed according to the equation:

$$\hat{\tau}_k = \tau_0 - (m+1)\Delta_1.$$

(Block 1260). If the computed correlation time $\hat{\tau}_k$ is not already in set A or a third set C (i.e., if the calculated correlation time is not the same as or not sufficiently near a correlation time already in sets A or C), it is added to set C (Block 1265). If additional correlation times are not needed, e.g., if no additional finger in the RAKE receiver remains to be defined, the identified correlation time(s) in set C are used in the RAKE receiver (along with the previously assigned correlation times in set A) (Block 1290). If additional correlation times need to be identified, however, the iteration variable k is incremented (Block 1270), and an additional candidate correlation time $\hat{\tau}_k$ is calculated according to the equation:

$$\hat{\tau}_k = \tau_{M-1} + (m+1)\Delta_1.$$

(Block 1275). If this calculated correlation time is not in set A or C (i.e., if the calculated correlation time is not the same as or not sufficiently near a correlation time already in sets A or C), it is added to set C (Block 1280). If additional correlation times are not needed, the correlation times in set C are used in the RAKE receiver (Block 1290). If additional correlation times are needed, the iteration variables k and m are incremented (Block 1285), and the loop is reentered with the calculation of a new candidate correlation time $\hat{\tau}_k$ (Block 1260). Additional loop operations then proceed as described above, until all the necessary correlation times have been determined.

A second correlation time selection strategy according to another embodiment of the present invention also uses an average optimal approach to select correlation times for an IRC RAKE receiver, such as the receiver 390' of FIG. 4. According to this second strategy:

1. Respective average signal strengths are determined for respective ones of a plurality of correlation outputs produced by a search correlation unit, such as the search correlation unit 610 of FIG. 6, at respective ones of a plurality of correlation times in a search window.
2. A first set of L correlation times $\tau_0, \ldots, \tau_{L-1}$ having corresponding determined average signal strengths greater than a first threshold are selected based on the signal strength measurements, where $\tau_0, \ldots, \tau_{L-1}$ is a series of increasing delays. These may be viewed as the desired signal collecting correlation times. In selecting the set of L correlation times, other criteria may also be applied, e.g., a minimum separation criteria could be used such that if two correlation times are separated by a time interval that is less than a predetermined threshold, only one of the times will be selected for inclusion in the set of L correlation times.
3. A subset of the set of M correlation times is then identified, the subset including M correlation times $\tau_0, \ldots, \tau_{M-1}$ for which the corresponding average signal strength is greater than a second threshold that is greater than the first threshold, where the subset of M correlation times includes a correlation time $\tau_J$ having a greatest corresponding signal strength and $\tau_0, \ldots, \tau_{M-1}$ is series of increasing delays.
4. Respective time differentials $\Delta_1, \ldots, \Delta_{M-1}$ between the strongest correlation time $\tau_J$ and respective other ones of the correlation times in the subset of M correlation times are determined, where $\Delta_1, \ldots, \Delta_{M-1}$ is a series of time differentials of increasing magnitude.
5. Interference collecting correlation times are determined from the time differentials, beginning with a correlation time $\tau_0$, according to the relationship:

$$\{\hat{\tau}_0, \hat{\tau}_1, \ldots\}$$
$$= \tau_0 - \Delta_1,$$
$$\tau_{M-1} + \Delta_1,$$
$$\tau_0 - \Delta_2,$$
$$\tau_{M-1} + \Delta_2,$$
$$\tau_0 - 2\Delta_1,$$
$$\tau_{M-1} + 2\Delta_1,$$
$$\tau_0 - 2\Delta_2,$$
$$\tau_{M-1} + 2\Delta_2 \ldots,$$

where determined correlation times that are the same as, or sufficiently near, correlation times already determined are excluded.

6. The identified desired signal collecting and interference collecting correlation times are used in the IRC-RAKE receiver.

Figure 13A:
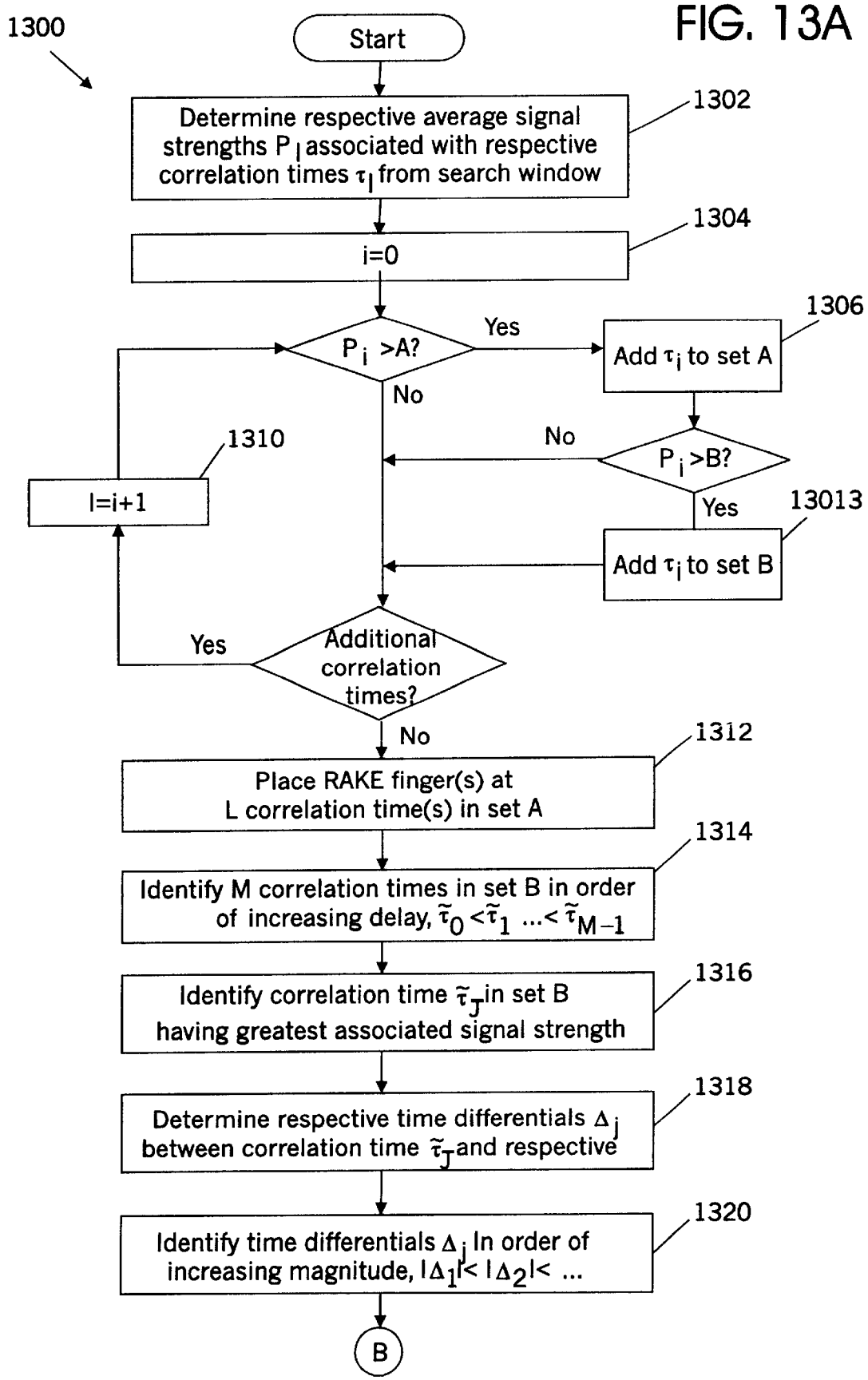
FIGS. 13A–13B illustrate exemplary operations of a second correlation time selection strategy according to an embodiment of the present invention.
Figures 1, 13B:
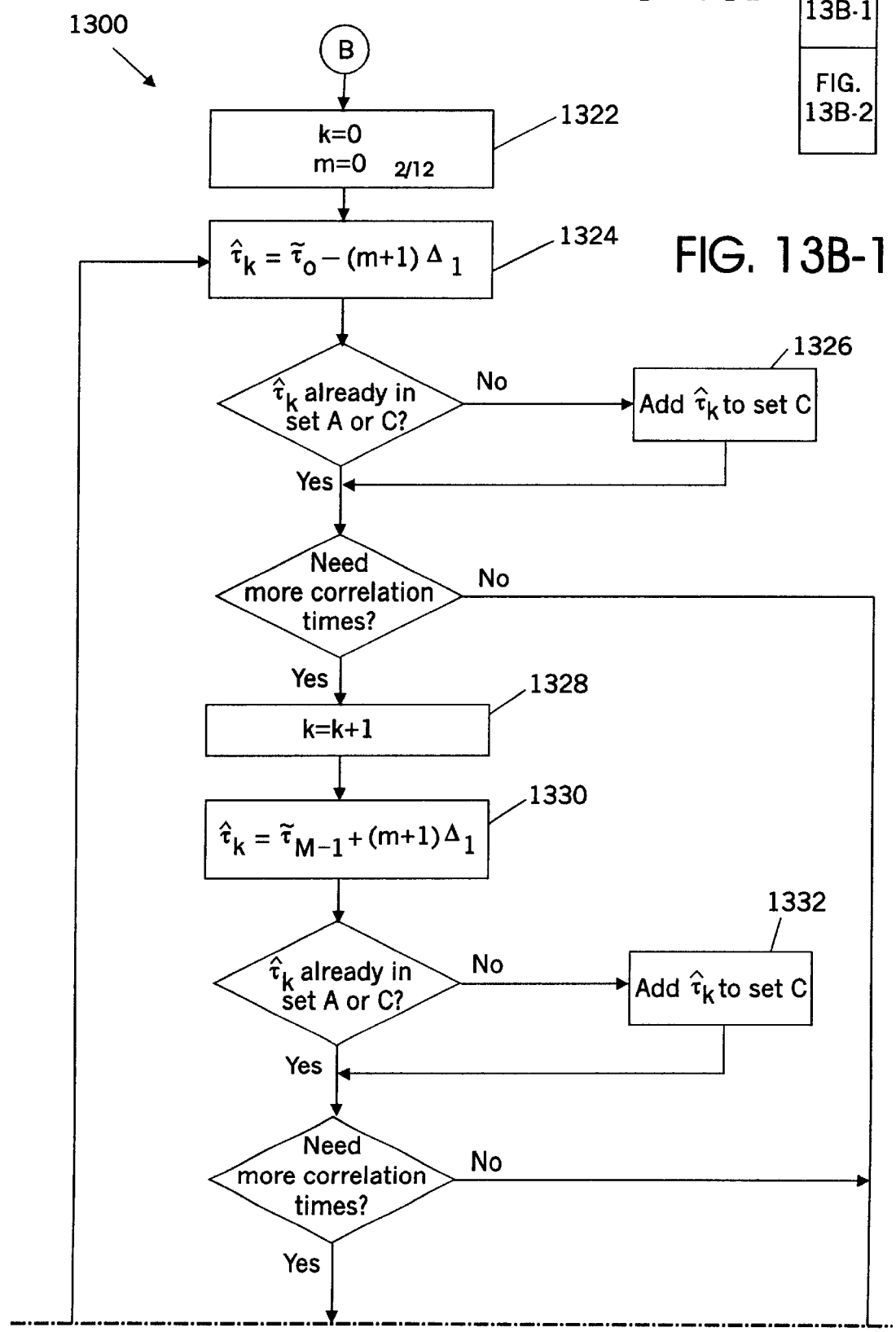
Figures 2, 13B:
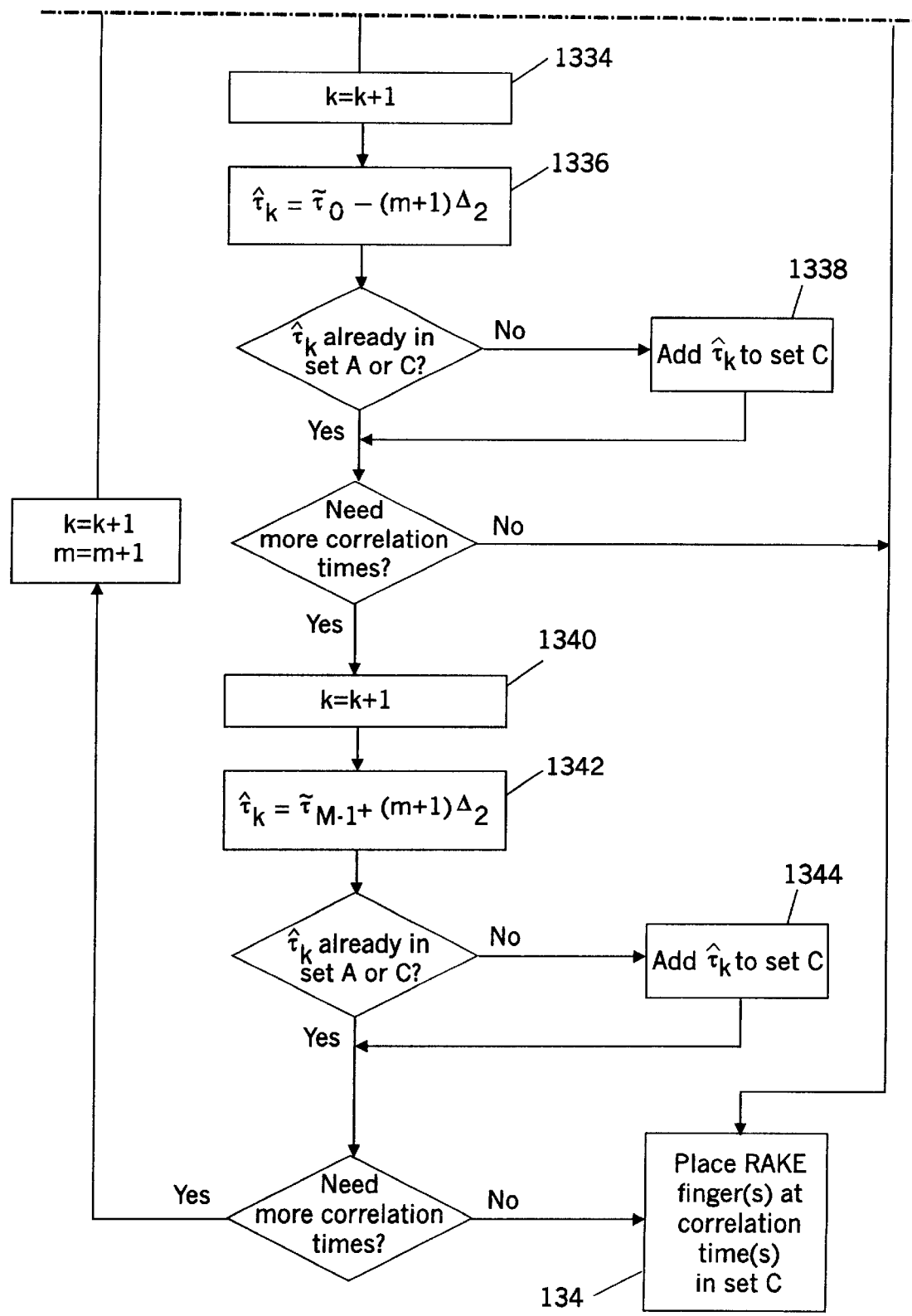

FIGS. 13A–13B illustrate exemplary operations 1300 for implementing this second selection strategy. Respective average signal strengths $P_i$ associated with a set of correlation times $\tau_i$ in a search window are determined (Block 1302). An iteration variable i is set to zero (Block 1304), and a loop is entered in which the signal strengths $P_i$ are examined to see if they meet predetermined criteria. If the signal strength $P_i$ associated with a particular correlation time $\tau_i$ greater than the first threshold A, the correlation time $\tau_i$ is added to a first set A (Block 1306). Each correlation time $\tau_i$ added to set A is also tested to see if the corresponding signal strength $P_i$ exceeds a second, higher threshold B. If it does, the correlation time $\tau_i$ is also added to a second set B (Block 1308). The iteration variable i is incremented (Block 1310), and next correlation value $\tau_i$ tested.

The correlation times in the first set A are sent to the RAKE receiver (Block 1312), as they represent desired signal collecting correlation times. The M correlation times $\tau_0, \tau_1, \ldots, \tau_{M-1}$ in set B are identified in order of increasing delay (Block 1314), and a correlation time $\tau_J$ having the greatest corresponding signal strength is identified (Block 1316). Respective time differentials $\Delta_j$ between the correlation time $\tau_J$ and respective other correlation times of set B are then determined (Block 1318), and identified in order of increasing delay $|\Delta_1| < |\Delta_2| < \ldots$ (Block 1320).

Iteration variables k and m are then set to zero (Block 1322), and a second loop for identifying interference collecting correlation times is entered. A first candidate correlation time $\hat{\tau}_k$ is computed (Block 1324) according to the equation:

$$\hat{\tau}_k = \tau_0 - (m+1)\Delta_1.$$

If the computed correlation time $\hat{\tau}_k$ is not in the first set A or a third set C (i.e., if the calculated correlation time is not the same as or not sufficiently near a correlation time already in sets A or C), it is added to set C (Block 1326). If additional correlation times are not needed, e.g., if no finger in the RAKE receiver remains to be defined, the identified correlation time(s) in set C are used in the RAKE receiver (Block 1346). If additional correlation times need to be identified, however, the iteration variable k is incremented (Block 1328), and an additional candidate correlation time $\hat{\tau}_k$ is calculated according to the equation:

$$\hat{\tau}_k = \tau_{M-1} + (m+1)\Delta_1.$$

(Block 1330). If this calculated correlation time is not in set A or C (i.e., if the calculated correlation time is not the same as or not sufficiently near a correlation time already in sets A or C), it is added to set C (Block 1332). If additional correlation times are not needed, e.g., if no additional finger in the RAKE receiver remain to be defined, the identified correlation time(s) in set C are used in the RAKE receiver (Block 1346).

However, if additional correlation times are needed, the iteration variable k is incremented again (Block 1334), and a new candidate correlation time $\hat{\tau}_k$ is calculated according to the equation:

$$\hat{\tau}_k = \tau_0 - (m+1)\Delta_2.$$

(Block 1336). If the computed correlation time $\hat{\tau}_k$ is not in sets A or C (i.e., if the calculated correlation time is not the same as or not sufficiently near a correlation time already in sets A or C), it is added to set C (Block 1338). If additional correlation times are not needed, the identified correlation time(s) in set C are used in the RAKE receiver (Block 1346). If additional correlation times need to be identified, the iteration variable k is again incremented (Block 1340), and an additional candidate correlation time $\hat{\tau}_k$ is calculated according to the equation:

$$\hat{\tau}_k = \tau_{M-1} + (m+1)\Delta_2.$$

(Block 1342). If this calculated correlation time $\hat{\tau}_k$ is not in sets A or C (i.e., if the calculated correlation time is not the same as or not sufficiently near a correlation time already in sets A or C), it is added to set C (Block 1344). If additional correlation times are not needed, the correlation time(s) in set C are used in the RAKE receiver (Block 1348). If additional correlation times are needed, the iteration variables k and m are incremented (Block 1346), and the loop is reentered with the calculation of a new candidate correlation time $\hat{\tau}_k$ (Block 1260). Additional loop operations then proceed as described above, until all the necessary correlation times have been determined.

A third correlation time selection strategy according to another embodiment of the present invention uses an instantaneous optimal approach to select correlation times for an IRC RAKE receiver, such as the receiver 390' of FIG. 4. According to this third strategy:

1. Respective instantaneous signal strengths are determined for respective ones of a plurality of correlation outputs produced by a search correlation unit, such as the search correlation unit 610 of FIG. 6, at respective ones of a plurality of correlation times in a search window.
2. A first set of L correlation times $\tau_0, \ldots, \tau_{L-1}$ having corresponding determined average signal strengths greater than a first threshold are selected based on the signal strength measurements, where $\tau_0, \ldots, \tau_{L-1}$ is a series of correlation times having decreasing corresponding signal strength. These may be viewed as desired signal collecting correlation times. In selecting the set of L correlation times, other criteria may also be applied, e.g., a minimum separation criteria could be used such that if two correlation times are separated by a time interval that is less than a predetermined threshold, only one of the times will be selected for inclusion in the set of L correlation times.
3. Respective time differentials $\Delta_1, \ldots, \Delta_{M-1}$ between the correlation time $\tau_0$ having the greatest average signal strength and respective other ones of the correlation times in the set of L correlation times are determined.
4. Interference collecting correlation times are determined from the time differentials, beginning with a correlation time $\hat{\tau}_0$, according to the relationship:

$$\{\hat{\tau}_0, \hat{\tau}_1, \ldots\} = \tau_0 - \Delta_1, \tau_0 - 2\Delta_1, \tau_0 - 3\Delta_1, \ldots,$$

where determined correlation times that are the same as, or sufficiently near, correlation times already determined are excluded.

5. The desired signal collecting and interference collecting correlation times are used in the IRC-RAKE receiver.

Figure 14A:
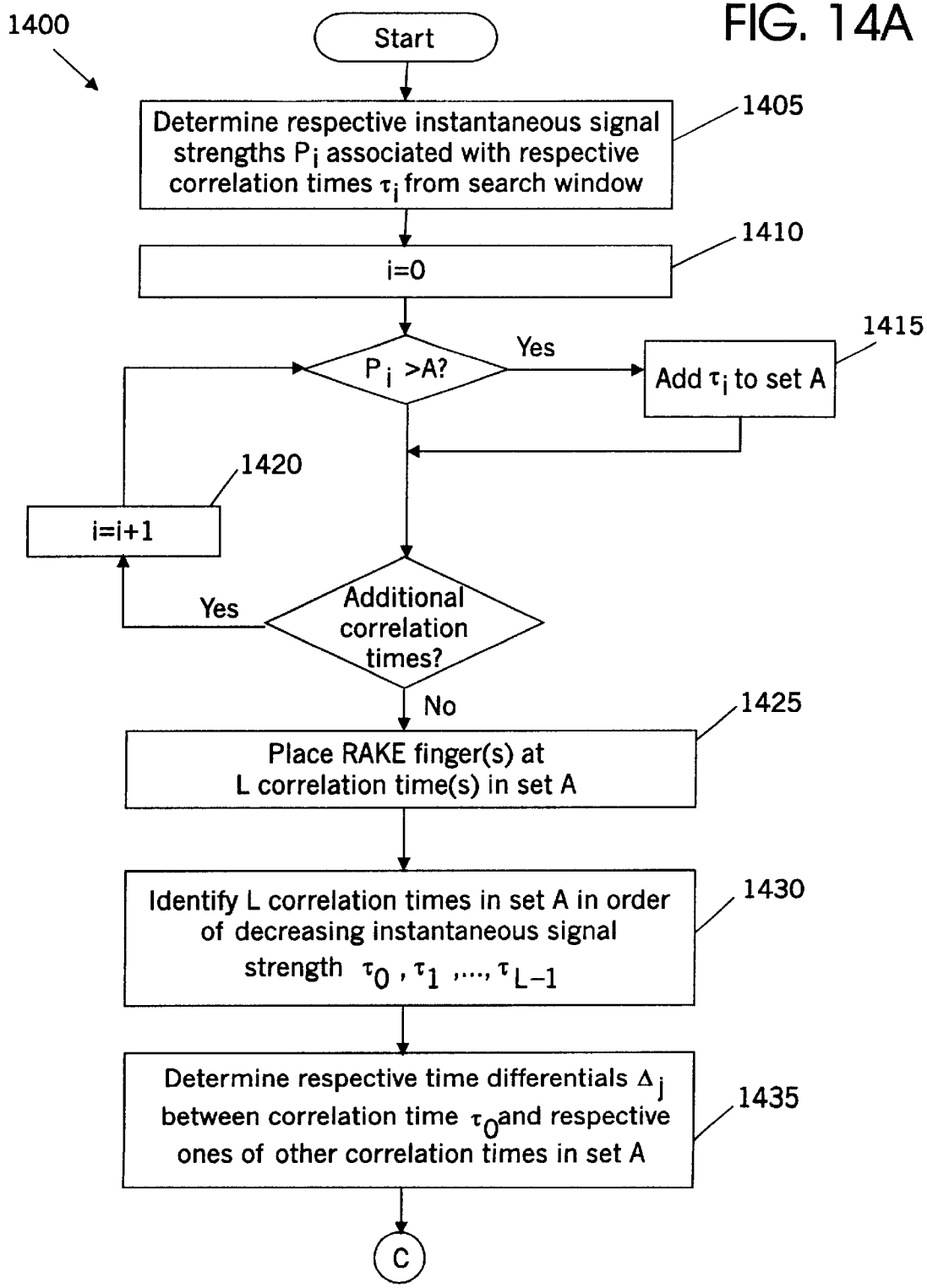
FIGS. 14A–14B illustrate exemplary operations of a third correlation time selection strategy according to an embodiment of the present invention.
Figure 14B:
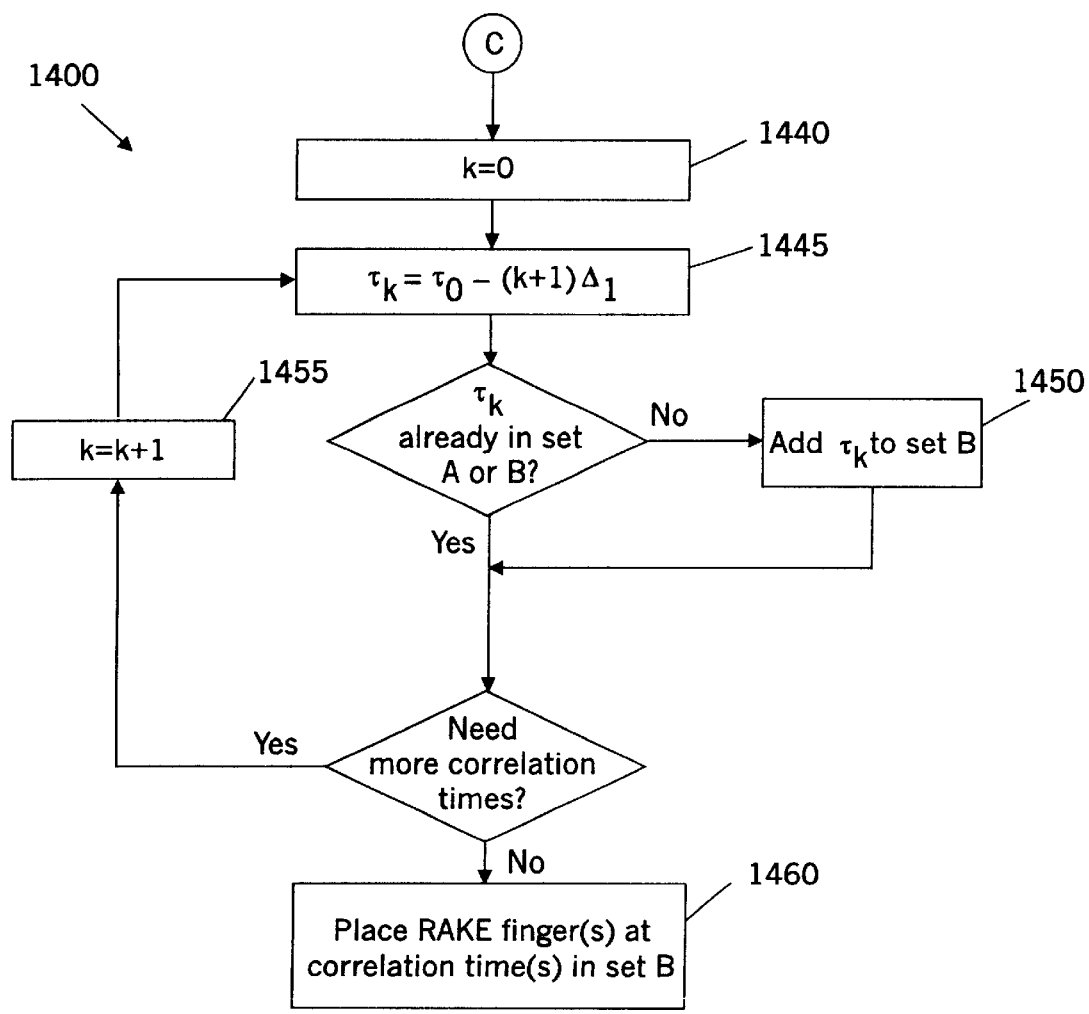

FIGS. 14A–14B illustrate exemplary operations 1400 for implementing this third selection strategy. Respective average signal strengths $P_i$ associated with a set of correlation times $\tau_i$ in a search window are determined (Block 1405). An iteration variable i is set to zero (Block 1410), and a loop is entered in which the signal strengths $P_i$ are examined to see if they meet a predetermined threshold criterion. If the signal strength $P_i$ associated with a particular correlation time $\tau_i$ is greater than a threshold A, the correlation time $\tau_i$ is added to a first set A (Block 1415). The iteration variable i is then incremented (Block 1420), and the next correlation value $\tau_i$ tested.

The correlation times in set A are sent to the RAKE receiver (Block 1225), as they represent the desired signal collecting correlation times. The L correlation times $\tau_0, \tau_1, \ldots, \tau_{M-1}$ in set A are also identified in order of decreasing corresponding instantaneous signal strength (Block 1430). Respective time differentials $\Delta_1, \Delta_2, \ldots$ between the correlation time $\tau_0$ and respective other correlation times of the set A are then determined (Block 1435).

An iteration variable k is then set to zero (Block 1440), and a second loop for identifying interference collecting correlation times is entered. A candidate correlation time $\tau_k$ is computed according to the equation:

$$\hat{\tau}_k = \tau_0 - (m+1)\Delta_1.$$

(Block 1445). If the computed correlation time $\hat{\tau}_k$ is not in set A or a second set B (i.e., if the calculated correlation time is not the same as or not sufficiently near a correlation time already in sets A or B), it is added set B (Block 1450). If additional correlation times are not needed, e.g., if no additional finger in the RAKE receiver remains to be defined, the identified correlation time(s) in set B are used in the RAKE receiver (Block 1460). If additional correlation times need to be identified, however, the iteration variable k is incremented (Block 1455) and the loop is reentered with the calculation of a new candidate correlation time $\hat{\tau}_k$ (Block 1445). Additional loop operations then proceed as described above, until all the necessary correlation times have been determined.

A fourth correlation time selection strategy according to another embodiment of the present invention also uses an instantaneous optimal approach to select correlation times for an IRC RAKE receiver, such as the receiver 390' of FIG. 4. According to this fourth strategy:

1. Respective instantaneous signal strengths are determined for respective ones of a plurality of correlation outputs produced by a search correlation unit, such as the search correlation unit 610 of FIG. 6, at respective ones of a plurality of correlation times in a search window.
2. A first set of L correlation times $\tau_0, \ldots, \tau_{L-1}$ having corresponding determined average signal strengths greater than a first threshold are selected based on the signal strength measurements are selected, where $\tau_0, \ldots, \tau_{L-1}$ is a series of correlation times having decreasing corresponding signal strength. These may be viewed as the desired signal collecting correlation times. In selecting the set of L correlation times, other criteria may also be applied, e.g., a minimum separation criteria could be used such that if two correlation times are separated by a time interval that is less than a predetermined threshold, only one of the times will be selected for inclusion in the set of L correlation times.

3. Respective time differentials $\Delta_1, \ldots, \Delta_{M-1}$ between the correlation time $\tau_0$ in the set of L correlation times having the greatest average signal strength and respective other ones of the correlation times in the set of L correlation times are determined.

4. Interference collecting correlation times are determined from the time differentials, beginning with a correlation time $\hat{\tau}_0$, according to the relationship:

$$\{\hat{\tau}_0, \hat{\tau}_1, \ldots\} = \tau_0 - \Delta_1, \tau_0 - \Delta_2, \tau_0 - 2\Delta_1, \tau_0 - 2\Delta_2, \ldots,$$

where determined correlation times that are the same as, or sufficiently near, correlation times already determined are excluded.

5. The desired signal collecting and interference collecting correlation times are used in the IRC-RAKE receiver.

Figure 15A:
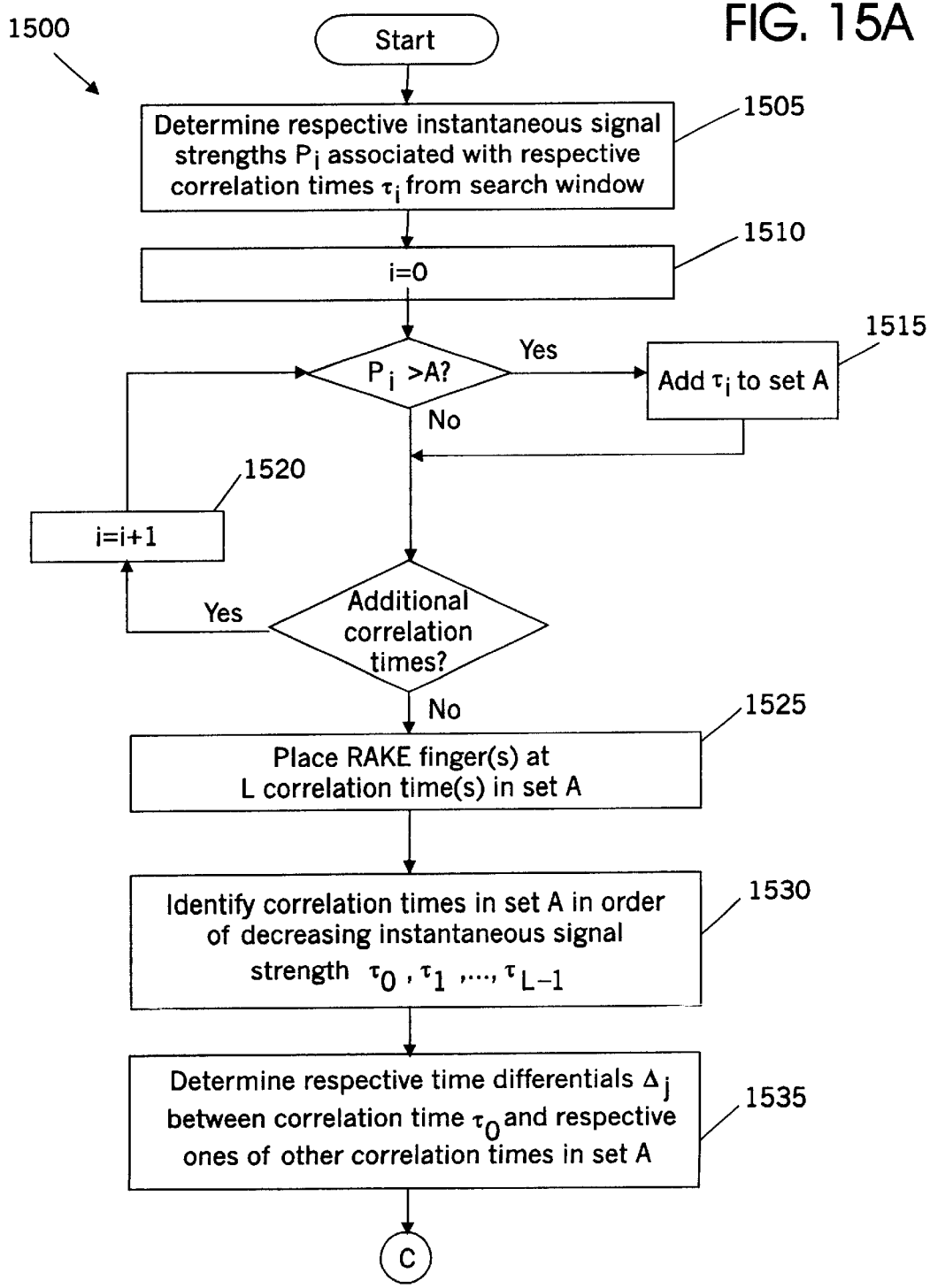
FIGS. 15A–15B illustrate exemplary operations of a fourth correlation time selection strategy according to an embodiment of the present invention.
Figure 15B:
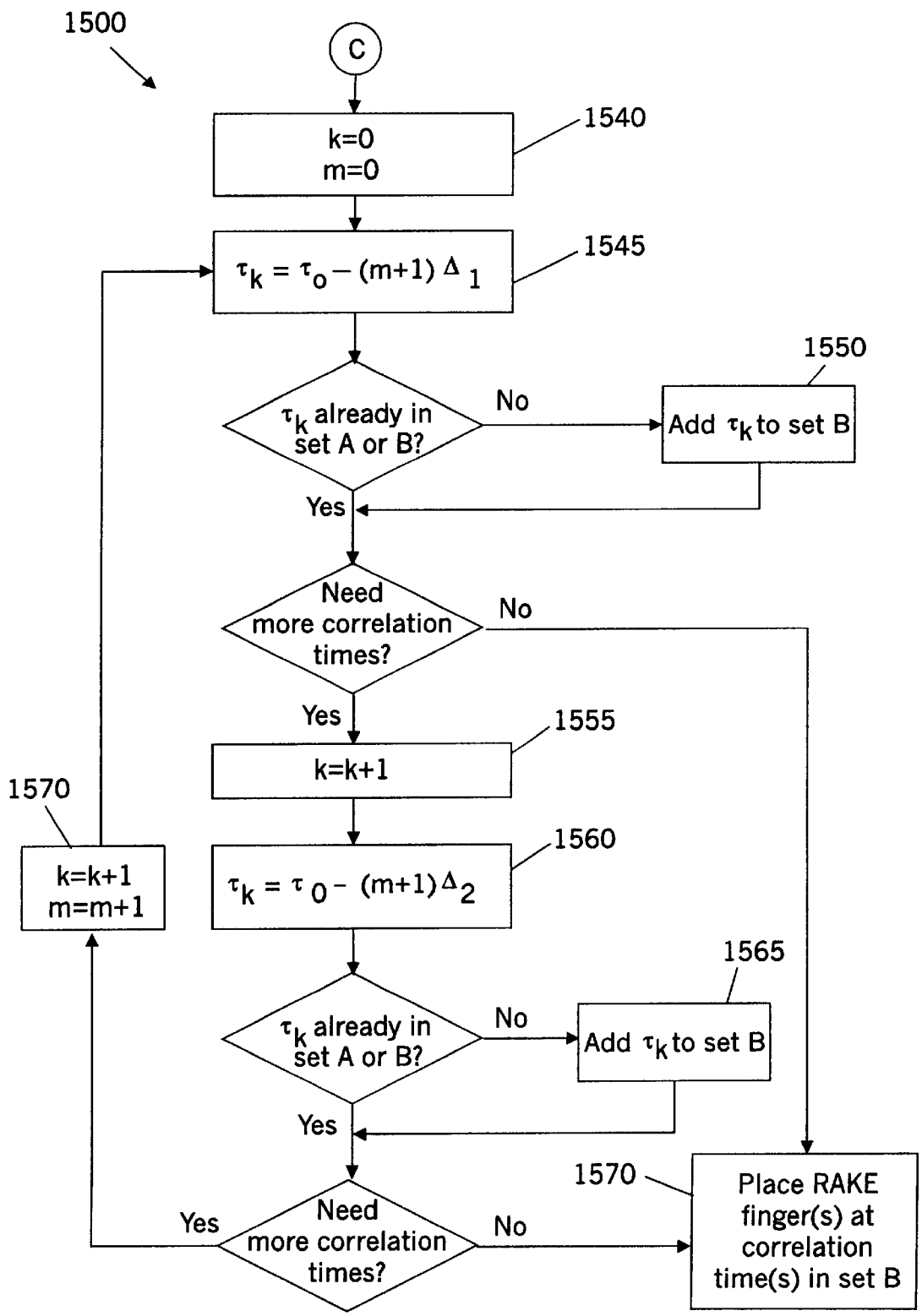

FIGS. 15A–15B illustrate exemplary operations 1500 for implementing this fourth selection strategy. Respective average signal strengths $P_i$ associated with a set of correlation times $\tau_i$ in a search window are determined (Block 1505). An iteration variable i is set to zero (Block 1510), and a loop is entered in which the signal strengths $P_i$ are examined to see if they meet predetermined criteria. If the signal strength $P_i$ associated with a particular correlation time $\tau_i$ is greater than a threshold A, the correlation time $\tau_i$ is added to a set A (Block 1515). The iteration variable i is then incremented (Block 1520), and the next correlation value $\tau_i$ tested.

The correlation times in set A are sent to the RAKE receiver (Block 1525), as they represent desired signal collecting correlation times. The L correlation times $\tau_0, \tau_1, \ldots, \tau_{L-1}$ in the set A are also identified in order of decreasing corresponding instantaneous signal strength (Block 1530). Respective time differentials $\Delta_1, \Delta_2, \ldots$ between the correlation time $\tau_0$ and respective other correlation times of set A are then determined (Block 1535).

Iteration variables k and m are then set to zero (Block 1540), and a second for identifying interference collecting correlation times is entered. A first candidate correlation time $\hat{\tau}_k$ is computed according to the equation:

$$\hat{\tau}_k = \tau_0 - (m+1)\Delta_1.$$

(Block 1545). If the computed correlation time $\hat{\tau}_k$ is not in set A or a second set B (i.e., if the calculated correlation time is not the same as or not sufficiently near a correlation time already in sets A or B), it is added to set B (Block 1550). If additional correlation times are not needed, e.g., if no additional finger in the RAKE receiver remains to be defined, the identified correlation time(s) in set B are used in the RAKE receiver (Block 1570). If additional correlation times need to be identified, however, the iteration variable k is incremented (Block 1555), and a new candidate correlation time $\hat{\tau}_k$ is computed according to the equation:

$$\hat{\tau}_k = \tau_0 - (m+1)\Delta_2.$$

(Block 1560). If the newly computed correlation time $\hat{\tau}_k$ is not in set A or set B (i.e., if the calculated correlation time is not the same as or not sufficiently near a correlation time already in sets A or B), it is added to set B (Block 1565). If additional correlation times are not needed, e.g., if no additional finger in the RAKE receiver remains to be defined, the identified correlation time(s) in set B are used in the RAKE receiver (Block 1570). If additional correlation times need to be identified, however, the iteration variable k is incremented (Block 1555), and the loop is reentered with the calculation of a new candidate correlation time $\hat{\tau}_k$ (Block 1545). Additional loop operations then proceed as described above, until all the necessary correlation times have been determined.

Several variations to the operations described in FIGS. 12A–12B, 13A–13B, 14A–14B, 15A–15B fall within the scope of the present invention. In the above-described third and fourth correlation time selection strategies, instantaneous signal strength measurements are made. The signal strength measurement for a particular correlation time preferably is made using a channel tracker assigned to that particular correlation time. In this manner, if the particular correlation time is selected, a channel estimate may be available for use in determining combining weights, e.g., in the weighting factor calculator 425 of FIG. 4, or the weighting factor generator 530 of FIG. 5.

In another variation, "probing fingers" may be used with an instantaneous optimal correlation time selection strategy to reduce search operations. According to such an approach, potential "desired signal" correlation times and potential "interference collecting" correlation times are identified based on average signal strength measurements. These potential correlation times may be selected, for example, using an average optimal strategy such as the first and second strategies described above. These potential correlation times may then be used as the initial "search set" (i.e., as probing fingers) for an instantaneous optimal selection strategy, such as the third and fourth strategies described above. The probing finger correlation times may be determined, for example, by monitoring a pilot channel.

In yet another variation, the threshold criterion used to select correlation times may be augmented by a "minimum count" criterion, such that a minimum number of correlation times is selected, regardless of whether the corresponding signal strengths exceed the predetermined threshold. For example, a "set of strongest paths" criteria may be used instead of selecting the correlation times having corresponding signal strengths exceeding a predetermined threshold, such that L (or M) correlation times having the highest corresponding signal strengths are selected. Hybrid criteria may also be used, for example, correlation times having corresponding signal strengths exceeding a predetermined threshold are selected up to a first number L, but if less than L'(where L' is less than L) correlation times have corresponding signal strengths less than the predetermined threshold, at least L' correlation times are selected. Adaptive threshold criteria could also be used. For example, a threshold used to select correlation times could be decreased or increased depending on the number of correlation times meeting the threshold criterion.

In still other variations, different time differentials may be used to select interference collecting correlation times. For example, although above-described embodiments compute time differentials with respect to a correlation time having a greatest signal strength, differentials with respect to other correlation times, e.g., to the correlation time having the second greatest signal strength, could also be determined, with multiples of these other differentials being added or subtracted from correlation times to determine interference collecting correlation times.

A fifth correlation time selection strategy, according to another embodiment of the present invention, uses an average optimal approach to select "slides" (sets of correlation times) for an IW RAKE receiver, such as the receiver 390" of FIG. 5. According to this fifth strategy:

1. Respective average signal strengths of respective ones of a plurality of correlation outputs for respective ones of a plurality of correlation times are determined.
2. A set of M correlation times $\tau_0, \ldots, \tau_{M-1}$ having corresponding determined average signal strengths that are greater than a threshold are identified, where $\tau_0, \ldots, \tau_{M-1}$ is a series of correlation times having decreasing corresponding determined average signal strengths.
3. Respective time differentials $\Delta_1, \Delta_2, \ldots, \Delta_{M-1}$ between the correlation time $\tau_0$ and respective other correlation times of the set of M correlation times are determined.
4. Correlation time sets $\{\hat{\tau}\}_i$ (or "slides") that are offset with respect to a "zero-delay" set $\{\hat{\tau}\}_0$ of correlation times (i.e., the set of M correlation times $\tau_0, \ldots, \tau_{M-1}$ are determined from the time differentials, beginning with a first correlation time set $\{\hat{\tau}\}_1$, according to the relationship:

$$\{\hat{\tau}\}_1, \{\hat{\tau}\}_2, \ldots = \{\hat{\tau}\}_0 - \Delta_1, \{\hat{\tau}\}_0 + \Delta_1, \{\hat{\tau}\}_0 - 2\Delta_1, \{\hat{\tau}\}_0 + 2\Delta_1, \ldots$$

5. The correlation time sets $\{\hat{\tau}\}_i$ determined in step (4) are used, along with the "zero delay" correlation time set $\{\hat{\tau}\}_0$, in the IW-RAKE receiver.

Figure 16A:
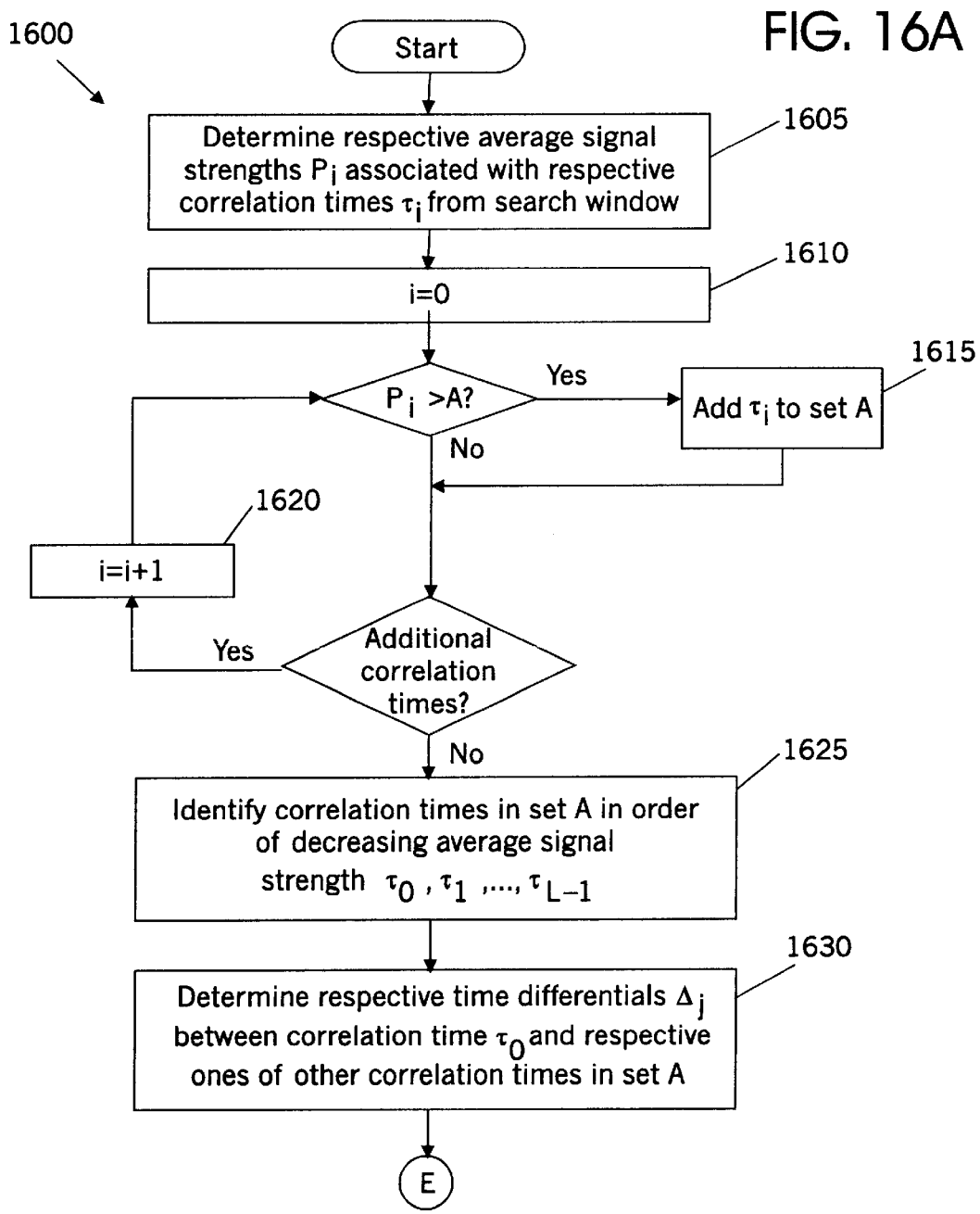
FIGS. 16A–16B illustrate exemplary operations of a fifth correlation time selection strategy according to an embodiment of the present invention.
Figure 16B:
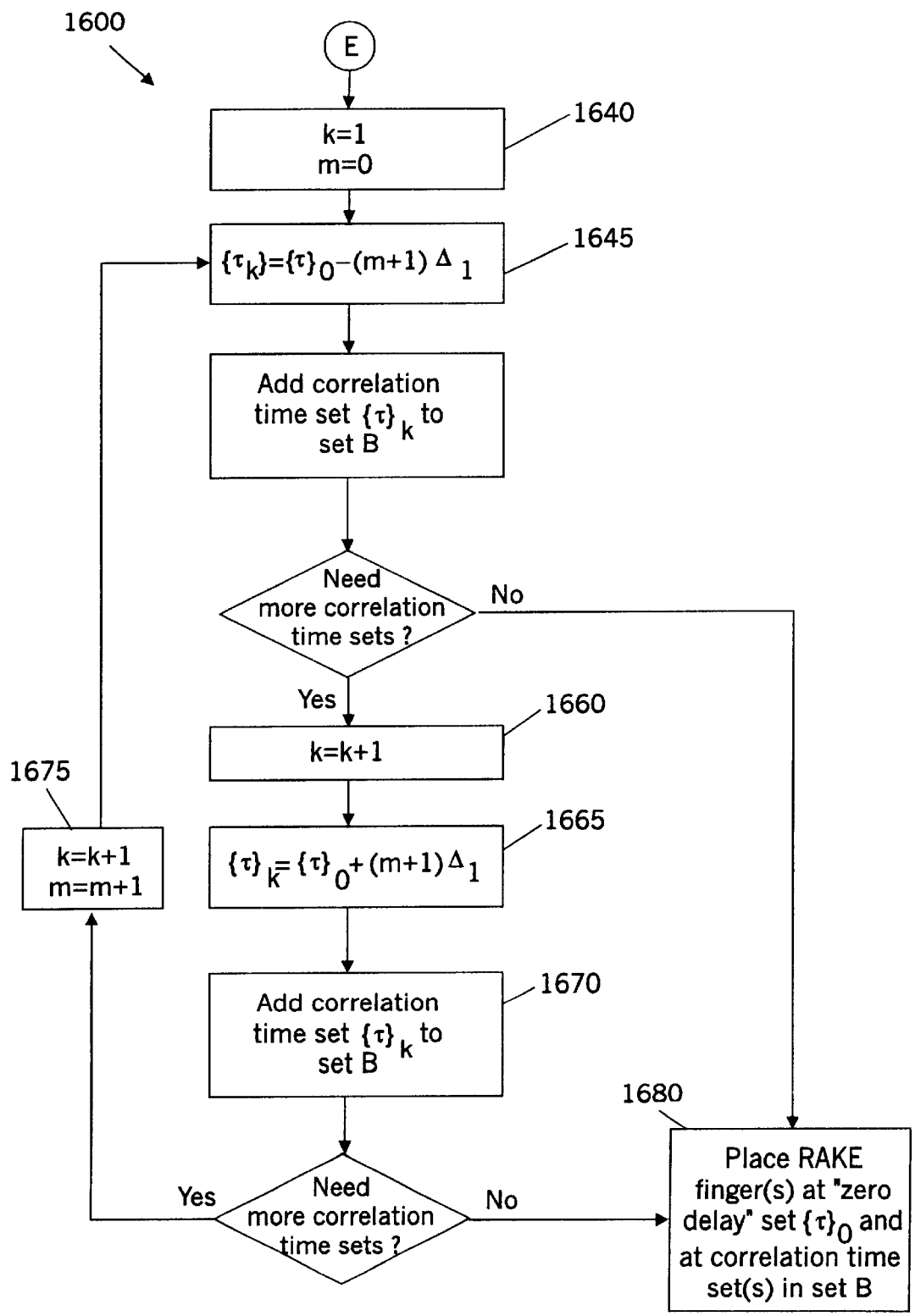

FIGS. 16A–16B illustrate exemplary operations 1600 for implementing this fifth selection strategy. Respective average signal strengths $P_i$ associated with a set of correlation times $\tau_i$ in a search window are determined (Block 1605). An iteration variable i is set to zero (0) (Block 1610), and a loop is entered in which the signal strengths $P_i$ are examined to see if they meet a predetermined threshold criterion. If the signal strength $P_i$ associated with a particular correlation time $\tau_i$ greater than a first threshold A, the correlation time $\tau_i$ is added to a first set A (Block 1615). If not, the iteration variable i is incremented (Block 1620), and next correlation value $\tau_i$ tested. The L correlation times $\tau_0, \tau_1, \ldots, \tau_{L-1}$ in set A are identified in order of decreasing signal strength (Block 1625). Respective time differentials $\Delta_j$ between the correlation time $\tau_0$ and respective other correlation times of set A are then determined (Block 1630).

Iteration variables k and m are then set to one and zero, respectively, (Block 1255), and a second loop is entered. A first correlation time set $\{\hat{\tau}\}_k$ is computed according to the equation:

$$\{\hat{\tau}\}_k = \{\hat{\tau}\}_0 - (m+1)\Delta_1,$$

where $\{\hat{\tau}\}_0$ represents a "zero delay" correlation time set (Block 1645). The computed correlation time set $\{\hat{\tau}\}_k$ is added to set B. If additional correlation time sets are not needed, e.g., if no additional correlation time set for the IW-RAKE receiver remains to be defined, the identified correlation time set(s) in set B, along with a "zero delay" correlation time set, are used in the IW-RAKE receiver (Block 1680). If additional correlation time sets need to be identified, however, the iteration variable k is incremented (Block 1660), and an additional correlation time set $\hat{\tau}_k$ is calculated according to the equation:

$$\{\hat{\tau}\}_k = \{\hat{\tau}\}_0 + (m+1)\Delta_1,$$

(Block 1665), and added to set B (Block 1670). If additional correlation time sets are not needed, the correlation time set(s) in set B, along with the zero delay correlation time, are used in the IW-RAKE receiver (Block 1680). If additional correlation time sets are needed, the iteration variables k and m are incremented (Block 1675), and the loop is reentered with the calculation of a new correlation time set $\{\hat{\tau}\}_k$ (Block 1645). Additional loop operations then proceed as described above, until all the necessary correlation times have been determined.

It will be appreciated that blocks and combinations of blocks of the flowcharts of FIGS. 12A–12B, 13A–13B, 14A–14B, 15A–15B, and 16A–16B can be implemented using special purpose hardware such as discrete analog and/or digital hardware, ASICs or gate arrays used to implement apparatus, such as the receiver apparatus described herein with reference to FIGS. 4–6. The blocks and combinations of blocks of the flowcharts of FIGS. 12A–12B, 13A–13B, 14A–14B, 15A–15B, and 16A–16B can also be implemented using computer program instructions which may be loaded and executed on a computer or other programmable apparatus, such as a microcontroller, microprocessor, ASIC, DSP or other processing circuit used to implement apparatus, such as the receiver apparatus described herein with reference to FIGS. 4–6, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowcharts of FIGS. 12A–12B, 13A–13B, 14A–14B, 15A–15B, and 16A–16B support combinations of means for performing the specified functions and combinations of steps for performing the specified functions. It will also be understood that each block of the flowcharts of FIGS. 12A–12B, 13A–13B, 14A–14B, 15A–15B, and 16A–16B, and combinations of blocks therein, can be implemented by special purpose hardware-based computer systems which perform the specified functions or steps, or combinations of special purpose hardware and computer instructions.

It will also be appreciated that other operations may be used in conjunction with or instead of the operations illustrated in FIGS. 12A–12B, 13A–13B, 14A–14B, 15A–15B, and 16A–16B. For example, the threshold criteria may be implemented in a number of different ways, such as by comparison to a "strongest" multipath component (ray) (e.g., by normalizing the multipath components to a multipath component with a highest signal power), or by using other relative measure such as signal-to-noise ratio (SNR). In addition, if delay spread in the channel is not compact, resulting in "islands" of multipath components, "interference collecting" correlation times at the edges of each such islands may be selected.

Although the strategies described above may be advantageous employed for suppression of "own-cell" interference, receiver performance may also be limited by interference from other cells, such as interference from another base station when a receiver is in a soft handoff mode. In such a situation, the strategies described above can also be used to select correlation times that suppress interference from this other base station, using the channel response that typically would be generated during soft-handoff procedures. If not in soft handoff, estimates of channel responses from other, interfering base stations may still be available as by-product of a mobile-assisted handoff (MAHO) procedure, and may be used to generate correlation times that collect energy from interfering signals produced by these other base stations. Hybrid strategies may also be used, which mix tap spacing according to multiple base station responses. Ultimately, a SNR figure of merit may be used to pick between several alternative correlation time selection strategies.

Correlation times may also be determined based on an inverse filter of a channel response estimate, such as an instantaneous channel response estimate or an average channel response estimate (e.g., an average channel response magnitude estimate). Considering a two-ray example with delay times $0$ and $d_1$ and corresponding channel amplitudes $1$ and $a_1$, respectively, where $|a_1|<1$, the impulse response of such a channel may be characterized by the z-domain polynomial:

$$g(z)=1+a_1 z^{-d_1}.$$

It can be shown that the inverse filter of $g(z)$ is given by:

$$\tilde{g}(z) = \sum_{k=0}^{\infty} b_k z^{-\tilde{d}_k},$$

where $b_k=(-a_1)^k$ and $\tilde{d}_k=-kd_1$. According to the inverse filtering principle, correlation times $\tilde{d}_k$ that have the corresponding coefficient $b_k$ satisfying the criterion $|b_k|>\eta$ may be selected for use in a RAKE receiver, where $\eta$ is a predetermined threshold. Such a procedure may be implemented, for example, in the correlation timing determiners 394, 394', 394" of FIGS. 4–6. Selecting correlation times in this manner may be particularly advantageous when impairment in a received signal is dominated by intra-cell interference.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of processing a communications signal, the method comprising the steps of:
   generating respective correlation metrics for respective ones of a plurality of multipath components of a first signal, a respective one of which has a respective time associated therewith; and
   generating respective time-offset correlations of a second signal with a modulation sequence at respective correlation times determined from time differentials between the times associated with the plurality of multipath components based on the correlation metrics associated with the plurality of multipath components.

2. A method according to claim 1, wherein the first and second signals comprise the same signal.

3. A method according to claim 1:
   wherein said step of generating respective correlation metrics comprises the step of processing the first signal to determine respective signal strengths of respective ones of the plurality of multipath components of the first signal; and
   wherein said step of generating respective time-offset correlations of a second signal comprises the step of generating respective time-offset correlations of the second signal with the modulation sequence at correlation times determined from time differentials between times associated with the plurality of multipath components based on the determined signal strengths of the plurality of multipath components.

4. A method according to claim 3:
   wherein said step of processing a first signal comprises the steps of:
      correlating the first signal with the modulation sequence at respective ones of a set of first correlation times to generate respective first correlation outputs;
      determining respective signal strengths for the first correlation outputs; and
      determining a second correlation time based on the determined signal strengths for the first correlation outputs; and
   wherein said step of generating respective time-offset correlations of a second signal comprises the step of generating respective time-offset correlations of the second signal with the modulation sequence at the first and second correlation times.

5. A method according to claim 4, wherein said step of correlating is preceded by the step of determining the set of first correlation times from the first signal.

6. A method according to claim 5, wherein said step of determining the set of first correlation times comprises the steps of:
   correlating the first signal with the modulation sequence at respective ones of a plurality of correlation times to produce respective ones of a plurality of correlation outputs;
   determining respective signal strengths of respective ones of the plurality of correlation outputs; and
   determining the set of first correlation times from the plurality of correlation times based on the determined signal strengths of the plurality of correlation outputs.

7. A method according to claim 6, wherein said step of determining a second correlation time comprises the steps of:
   determining one first correlation time of the set of first correlation times that has a signal strength meeting a predetermined criterion;
   determining at least one time differential between the identified one first correlation time and at least one other first correlation time of the set of first correlation times; and
   determining the second correlation time from the at least one time differential.

8. A method according to claim 6:
   wherein said step of determining respective signal strengths of respective ones of the plurality of correlation outputs comprises the step of determining respective average signal strengths for respective ones of the plurality of correlation outputs;
   wherein said step of determining a set of first correlation times comprises the step of selecting a set of L first correlation times $\tau_0, \ldots, \tau_{L-1}$ having corresponding determined average signal strengths greater than a first threshold, wherein $\tau_0, \ldots, \tau_{L-1}$ denotes a series of first correlation times representing increasing delays;
   wherein said step of determining a second correlation time comprises the steps of:
      selecting a subset of the set of L first correlation times having corresponding determined average signal strengths greater than a second threshold, the subset including M first correlation times $\tau_0, \ldots, \tau_{M-1}$ wherein $\tau_0, \ldots, \tau_{M-1}$ denotes a series of first correlation times representing increasing delays;

determining respective time differentials $\Delta_1, \ldots, \Delta_{M-1}$ between one first correlation time of the subset of M first correlation times having a greatest average signal strength and respective other first correlation times of the subset of M first correlation times, wherein $\Delta_1, \ldots, \Delta_{M-1}$ denotes a series of time differentials of increasing magnitude; and determining at least one second correlation time $\{\hat{\tau}_i\}$ in an order of preference beginning with a second correlation time $\hat{\tau}_0$ according to the relationship:

$$\{\hat{\tau}_0, \hat{\tau}_1, \ldots\} = \{\tau_0 - \Delta_1, \tau_{M-1} + \Delta_1, \tau_0 - 2\Delta_1, \tau_{M-1} + 2\Delta_1, \ldots\}; \text{ and}$$

wherein said step of generating respective time-offset correlations of a second signal comprises the step of generating respective time-offset correlations of the second signal with the modulation sequence at the L first correlation times and the determined at least one second correlation time.

9. A method according to claim 6:

wherein said step of determining respective signal strengths of respective ones of the plurality of correlation outputs comprises the step of determining respective average signal strengths for respective ones of the plurality of correlation outputs;

wherein said step of determining a set of first correlation times comprises the step of selecting a set of L first correlation times $\tau_0, \ldots, \tau_{L-1}$ having corresponding determined average signal strengths greater than a first threshold, wherein $\tau_0, \ldots, \tau_{L-1}$ denotes a series of first correlation times representing increasing delays;

wherein said step of determining a second correlation time comprises the steps of:

selecting a subset of the set of L first correlation times having corresponding determined average signal strengths greater than a second threshold, the subset including M first correlation times $\tau_0, \ldots, \tau_{M-1}$, wherein $\tau_0, \ldots, \tau_{M-1}$ denotes a series of correlation times representing increasing delays;

determining respective time differentials $\Delta_1, \Delta_2, \ldots, \Delta_{M-1}$ between one first correlation time of the subset of M first correlation times having a greatest average signal strength and respective other first correlation times of the subset of M first correlation times, wherein $\Delta_1, \Delta_2, \ldots, \Delta_{M-1}$ denotes a series of time differentials of increasing magnitude; and determining at least one second correlation time $\{\hat{\tau}_i\}$ in an order of preference beginning with a second correlation time $\hat{\tau}_0$ according to the relationship:

$$\{\hat{\tau}_0, \hat{\tau}_1, \ldots\}$$

$$= \tau_0 - \Delta_1,$$

$$\tau_{M-1} + \Delta_1,$$

$$\tau_0 - \Delta_2,$$

$$\tau_{M-1} + \Delta_2,$$

$$\tau_0 - 2\Delta_1,$$

$$\tau_{M-1} + 2\Delta_1,$$

$$\tau_0 - 2\Delta_2,$$

$$\tau_{M-1} + 2\Delta_2 \ldots; \text{ and}$$

wherein said step of generating respective time-offset correlations of a second signal comprises the step of generating respective time-offset correlations of the second signal with the modulation sequence at the L first correlation times and the determined at least one second correlation time.

10. A method according to claim 6:

wherein said step of determining respective signal strengths of respective ones of the plurality of correlation outputs comprises the step of determining respective instantaneous signal strengths for respective ones of the plurality of correlation outputs;

wherein said step of determining a set of first correlation times comprises the step of selecting a set of L first correlation times $\tau_0, \ldots, \tau_{L-1}$ having corresponding determined instantaneous signal strengths exceeding a threshold, wherein $\tau_0, \ldots, \tau_{L-1}$ denotes a series of first correlation times having decreasing determined instantaneous signal strengths associated therewith; and wherein said step of determining a second correlation time comprises the steps of:

determining respective time differentials $\Delta_1, \Delta_2, \ldots, \Delta_{M-1}$ between the first correlation time $\tau_0$ having a greatest determined instantaneous signal strength associated therewith and respective other first correlation times of the set of L first correlation times $\tau_0, \ldots, \tau_{L-1}$, wherein $\Delta_1, \Delta_2, \ldots, \Delta_{M-1}$ denotes a series of time differentials for first correlation times having decreasing determined instantaneous signal strengths associated therewith; and determining at least one second correlation time $\hat{\tau}_i$ in an order of preference beginning with a second correlation time $\hat{\tau}_0$ according to the relationship:

$$\{\hat{\tau}_0, \hat{\tau}_1, \ldots\} = \tau_0 - \Delta_1, \tau_0 - 2\Delta_1, \tau_0 - 3\Delta_1, \ldots; \text{ and}$$

wherein said step of generating respective time-offset correlations of a second signal comprises the step of generating respective time-offset correlations of the second signal with the modulation sequence at the L first correlation times and the determined at least one second correlation time.

11. A method according to claim 6:

wherein said step of determining respective signal strengths of respective ones of the plurality of correlation outputs comprises the step of determining respective instantaneous signal strengths for respective ones of the plurality of correlation outputs;

wherein said step of determining a set of first correlation times comprises the step of selecting a set of L first correlation times $\tau_0, \ldots, \tau_{L-1}$ having corresponding determined instantaneous signal strengths exceeding a threshold, wherein $\tau_0, \ldots, \tau_{L-1}$ denotes a series of correlation times having decreasing determined instantaneous signal strengths associated therewith; and wherein said step of determining a second correlation time comprises the steps of:

determining respective time differentials $\Delta_1, \Delta_2, \ldots, \Delta_{M-1}$ between the first correlation time $\hat{\tau}_0$ having the greatest determined instantaneous signal strength and respective other first correlation times of the set of L first correlation times, wherein $\Delta_1, \Delta_2, \ldots, \Delta_{M-1}$ denotes a series of time differentials for correlation times having decreasing determined instantaneous signal strengths associated therewith; and determining at least one second correlation time $\{\hat{\tau}_i\}$ in an order of preference beginning with a second correlation time $\hat{\tau}_0$ according to the relationship:

$$\{\hat{\tau}_0, \hat{\tau}_1, \ldots\} = \tau_0 - \Delta_1, \tau_0 - \Delta_2, \tau_0 - 2\Delta_1, \tau_0 - 2\Delta_2, \ldots; \text{ and}$$

wherein said step of generating respective time-offset correlations of a second signal comprises the step of generating respective time-offset correlations of the second signal with the modulation sequence at the L first correlation times and the determined at least one second correlation time.

12. A method according to claim 6:
wherein said step of determining respective signal strengths of respective ones of the plurality of correlation outputs comprises the step of determining respective average signal strengths for respective ones of the plurality of correlation outputs;
wherein said step of determining a set of first correlation times comprises the step of selecting a set of M first correlation times $\tau_0, \ldots, \tau_{M-1}$ having determined average signal strengths associated therewith that are greater than a threshold, wherein $\tau_0, \ldots, \tau_{M-1}$ denotes a series of correlation times having decreasing determined average signal strength associated therewith; and
wherein said step of determining a second correlation time comprises the steps of:
determining respective time differentials, $\Delta_1, \Delta_2, \ldots, \Delta_{M-1}$ between the first correlation time $\tau_0$ and respective other first correlation times of the subset of M first correlation times; and
determining at least one set of second correlation times $\{\hat{\tau}_i\}$, in an order of preference beginning with a set of second correlation times $\{\hat{\tau}\}_1$ according to the relationship:

$$\{\hat{\tau}\}_1, \{\hat{\tau}\}_2, \ldots = \{\hat{\tau}\}_0 - \Delta_1, \{\hat{\tau}\}_0 + \Delta_1, \{\hat{\tau}\}_0 - 2\Delta_1, \{\hat{\tau}\}_0 + 2\Delta_1, \ldots$$

where $\{\hat{\tau}\}_0$ is a zero-delay correlation time set; and
wherein said step of generating respective time-offset correlations of a second signal comprises the step of generating respective time-offset correlations of the second signal with the modulation sequence at the zero-delay correlation time set and the determined at least one set of second correlation times.

13. A method according to claim 6, wherein said step of determining a set of first correlation times comprises the step of selecting correlation times of the plurality of correlation times having a corresponding determined signal strengths that meet a predetermined criterion.

14. A method according to claim 13, wherein said step of selecting comprises the step of selecting correlation times of the plurality of correlation times having corresponding determined signal strengths exceeding a predetermined threshold.

15. A method according to claim 6, wherein said step of determining respective signal strengths of respective ones of the plurality of correlation outputs comprises the step of determining one of absolute signal strengths or a relative signal strengths.

16. A method according to claim 15, wherein said step of determining respective signal strengths of respective ones of the plurality of correlation outputs comprises the step of determining one of normalized signal strengths or signal to noise ratios.

17. A method according to claim 6, wherein said step of determining respective signal strengths of respective ones of the plurality of correlation outputs comprises the step of determining one of average signal strengths or instantaneous signal strengths.

18. A method according to claim 4, wherein said step of determining respective signal strengths of the first correlation outputs comprises the step of determining one of absolute signal strengths or relative signal strengths of the first correlation outputs.

19. A method according to claim 4, wherein said step of determining respective signal strengths of the first correlation outputs comprises the step of determining one of normalized signal strengths or signal to noise ratios of the first correlation outputs.

20. A method according to claim 1:
wherein said step of generating respective correlation metrics comprises the steps of:
generating an estimated channel response from the first signal; and
determining an inverse filter of the estimated channel response, including respective ones of a plurality of inverse filter coefficients and respective delays associated therewith; and
wherein said step of generating respective time-offset correlations comprises the step of generating respective time-offset correlation of the second signal with the modulation sequence at respective correlation times selected from the plurality of delays based on the inverse filter coefficients.

21. A method according to claim 20:
wherein said step of generating an estimated channel response comprises the step of generating an instantaneous channel response estimate; and
wherein said step of determining an inverse filter comprises the step of determining the inverse filter from the instantaneous channel response estimate.

22. A method according to claim 20:
wherein said step of generating an estimated channel response comprises the step of generating an average channel response estimate; and
wherein said step of determining an inverse filter comprises the step of determining the inverse filter from the average channel response estimate.

23. A method according to claim 20, wherein said step of generating respective time-offset correlations of the second signal with the modulation sequence at respective correlation times selected from the plurality of delays comprises the step of generating respective time-offset correlations of the second signal with the modulation sequence at delays of the plurality of delays for which the corresponding inverse filter coefficient is greater than a predetermined threshold.

24. A method according to claim 1, further comprising the steps of:
generating an interference-compensated signal from the generated time-offset correlations of the second signal with the modulation sequence; and
recovering information from the interference-compensated signal.

25. A receiver, comprising:
a correlation timing determiner, responsive to a first signal, that generates respective correlation metrics for respective ones of a plurality of multipath components of the first signal, a respective one of which has a respective time associated therewith, and determines a set of correlation times from time differentials between the times associated with the plurality of multipath components based on the correlation metrics associated with the plurality of multipath components;

a correlation unit operatively associated with the correlation timing determiner and responsive to a second signal, that generates respective time-offset correlations of a second signal with a modulation sequence at respective correlation times of the selected set of correlation times; and a combiner that combines the time-offset correlations of the second signal with the modulation sequence to produce an estimate of information represented by the second signal.

26. A receiver according to claim 25, wherein the first and second signals comprise the same signal.

27. A receiver according to claim 25, wherein the correlation timing determiner comprises:

a search correlation unit that generates respective correlation outputs for respective ones of the multipath components;

a signal strength determiner that determines respective signal strengths of respective ones of the plurality of multipath components of the first signal; and a correlation time selector that selects the set of correlation times based on the determined signal strengths.

28. A receiver according to claim 27:

wherein the search correlation unit correlates the first signal with the modulation sequence at respective ones of a set of first correlation times to generate respective first correlation outputs;

wherein the signal strength determiner determines respective signal strengths for the first correlation outputs;

wherein the correlation time selector selects a second correlation time based on the determined signal strengths for the first correlation outputs; and wherein the correlation unit generates respective time-offset correlations of the second signal with the modulation sequence at the first and second correlation times.

29. A receiver according to claim 28, wherein the correlation time selector comprises:

means for determining one first correlation time of the set of first correlation times that has a signal strength meeting a predetermined criterion;

means for determining at least one time differential between the identified one first correlation time and at least one other first correlation time of the set of first correlation times; and means for determining the second correlation time from the at least one time differential.

30. A receiver according to claim 27, wherein the signal strength determiner determines one of absolute signal strengths or a relative signal strengths.

31. A receiver according to claim 30, wherein the signal strength determiner determines one of normalized signal strengths or signal to noise ratios.

32. A receiver according to claim 30, wherein the signal strength determiner determines one of average signal strengths or instantaneous signal strengths.

33. A receiver according to claim 25:

wherein the correlation timing determiner comprises:

means for generating an estimated channel response from the first signal; and means for determining an inverse filter of the estimated channel response, including respective ones of a plurality of inverse filter coefficients and respective delays associated therewith; and means for determining the set of correlation times at respective correlation times selected from the plurality of delays based on the inverse filter coefficients.

34. A receiver according to claim 25, wherein the combiner cancels interference with respect to a desired signal, and wherein the correlation timing determiner selects correlation times such that the correlation unit preferentially collects energy in the second signal associated with the desired signal and the interference.

35. A receiver, comprising:

means for generating respective correlation metrics for respective ones of a plurality of multipath components of a first signal; and means, responsive to said means for generating respective correlation metrics, for generating respective time-offset correlations of a second signal with a modulation sequence at respective correlation times determined from time differentials between times associated with the plurality of multipath components based on the correlation metrics associated with the plurality of multipath components.

36. A receiver according to claim 35, wherein the first and second signals comprise the same signal.

37. A receiver according to claim 35:

wherein said means for generating respective correlation metrics comprises means for processing the first signal to determine respective signal strengths of respective ones of the plurality of multipath components of the first signal; and wherein said means for generating respective time-offset correlations of a second signal comprises means for generating respective time-offset correlations of the second signal with the modulation sequence at correlation times determined from time differentials between times associated with the plurality of multipath components based on the determined signal strengths of the plurality of multipath components.

38. A receiver according to claim 37:

wherein said means for processing a first signal comprises:

means for correlating the first signal with the modulation sequence at respective ones of a set of first correlation times to generate respective first correlation outputs;

means for determining respective signal strengths for the first correlation outputs; and means for determining a second correlation time based on the determined signal strengths for the first correlation outputs; and wherein said means for generating respective time-offset correlations of a second signal comprises means for generating respective time-offset correlations of the second signal with the modulation sequence at the first and second correlation times.

39. A receiver according to claim 38, further comprising means for determining the set of first correlation times from the first signal.

40. A receiver according to claim 39, wherein said means for determining the set of first correlation times comprises:

means for correlating the first signal with the modulation sequence at respective ones of a plurality of correlation times to produce respective ones of a plurality of correlation outputs;

means for determining respective signal strengths of respective ones of the plurality of correlation outputs; and means for determining the set of first correlation times from the plurality of correlation times based on the determined signal strengths of the plurality of correlation outputs.

41. A receiver according to claim 40, wherein said means for determining a second correlation time comprises:
- means for determining one first correlation time of the set of first correlation times that has a signal strength meeting a predetermined criterion;
- means for determining at least one time differential between the identified one first correlation time and at least one other first correlation time of the set of first correlation times; and
- means for determining the second correlation time from the at least one time differential.

42. A receiver according to claim 40:
wherein said means for determining respective signal strengths of respective ones of the plurality of correlation outputs comprises means for determining respective average signal strengths for respective ones of the plurality of correlation outputs;
wherein said means for determining a set of first correlation times comprises means for selecting a set of L first correlation times $\tau_0, \ldots, \tau_{L-1}$ having corresponding determined average signal strengths greater than a first threshold, wherein $\tau_0, \ldots, \tau_{L-1}$ denotes a series of first correlation times representing increasing delays;
wherein said means for determining a second correlation time comprises:
- means for selecting a subset of the set of L first correlation times having corresponding determined average signal strengths greater than a second threshold, the subset including M first correlation times $\tau_0, \ldots, \tau_{M-1}$, wherein $\tau_0, \ldots, \tau_{M-1}$ denotes a series of first correlation times representing increasing delays;
- means for determining respective time differentials $\Delta_1, \ldots, \Delta_{M-1}$ between one first correlation time of the subset of M first correlation times having a greatest average signal strength and respective other first correlation times of the subset of M first correlation times, wherein $\Delta_1, \ldots, \Delta_{M-1}$ denotes a series of time differentials of increasing magnitude; and
- means for determining at least one second correlation time $\{\hat{\tau}_i\}$ in an order of preference beginning with a second correlation time $\hat{\tau}_0$ according to the relationship:

$$\{\hat{\tau}_0, \hat{\tau}_1, \ldots\} = \{\tau_0 - \Delta_1, \tau_{M-1} + \Delta_1, \tau_0 - 2\Delta_1, \tau_{M-1} + 2\Delta_1, \ldots\}; \text{ and}$$

wherein said means for generating respective time-offset correlations of a second signal comprises means for generating respective time-offset correlations of the second signal with the modulation sequence at the L first correlation times and the determined at least one second correlation time.

43. A receiver according to claim 40:
wherein said means for determining respective signal strengths of respective ones of the plurality of correlation outputs comprises means for determining respective average signal strengths for respective ones of the plurality of correlation outputs;
wherein said means for determining a set of first correlation times comprises means for selecting a set of L first correlation times $\tau_0, \ldots, \tau_{L-1}$ having corresponding determined average signal strengths greater than a first threshold, wherein $\tau_0, \ldots, \tau_{L-1}$ denotes a series of first correlation times representing increasing delays;
wherein said means for determining a second correlation time comprises the steps of:
- means for selecting a subset of the set of L first correlation times having corresponding determined average signal strengths greater than a second threshold, the subset including M first correlation times $\tau_0, \ldots, \tau_{M-1}$, wherein $\tau_0, \ldots, \tau_{M-1}$ denotes a series of correlation times representing increasing delays;
- means for determining respective time differentials $\Delta_1, \Delta_2, \ldots, \Delta_{M-1}$ between one first correlation time of the subset of M first correlation times having a greatest average signal strength and respective other first correlation times of the subset of M first correlation times, wherein $\Delta_1, \Delta_2, \ldots, \Delta_{M-1}$ denotes a series of time differentials of increasing magnitude; and
- means for determining at least one second correlation time $\{\hat{\tau}_i\}$ in an order of preference beginning with a second correlation time $\hat{\tau}_0$ according to the relationship:

$$\{\hat{\tau}_0, \hat{\tau}_1, \ldots\}$$
$$= \tau_0 - \Delta_1,$$
$$\tau_{M-1} + \Delta_1,$$
$$\tau_0 - \Delta_2,$$
$$\tau_{M-1} + \Delta_2,$$
$$\tau_0 - 2\Delta_1,$$
$$\tau_{M-1} + 2\Delta_1,$$
$$\tau_0 - 2\Delta_2,$$
$$\tau_{M-1} + 2\Delta_2 \ldots; \text{ and}$$

wherein said means for generating respective time-offset correlations of a second signal comprises means for generating respective time-offset correlations of the second signal with the modulation sequence at the L first correlation times and the determined at least one second correlation time.

44. A receiver according to claim 40:
wherein said means for determining respective signal strengths of respective ones of the plurality of correlation outputs comprises means for determining respective instantaneous signal strengths for respective ones of the plurality of correlation outputs;
wherein said means for determining a set of first correlation times comprises means for selecting a set of L first correlation times $\tau_0, \ldots, \tau_{L-1}$ having corresponding determined instantaneous signal strengths exceeding a threshold, wherein $\tau_0, \ldots, \tau_{L-1}$ denotes a series of first correlation times having decreasing determined instantaneous signal strengths associated therewith; and
wherein said means for determining a second correlation time comprises the steps of:
- means for determining respective time differentials $\Delta_1, \Delta_2, \ldots, \Delta_{M-1}$ between the first correlation time $\tau_0$ having a greatest determined instantaneous signal strength associated therewith and respective other first correlation times of the set of L first correlation times $\tau_0, \ldots, \tau_{L-1}$, wherein $\Delta_1, \Delta_2, \ldots, \Delta_{M-1}$ denotes a series of time differentials for first correlation times having decreasing determined instantaneous signal strengths associated therewith; and means for determining at least one second correlation time $\hat{\tau}_i$ in an order of preference beginning with a second correlation time $\hat{\tau}_0$ according to the relationship:

$\{\hat{\tau}_0, \hat{\tau}_1, \ldots\} = \tau_0-\Delta_1, \tau_0-2\Delta_1, \tau_0-3\Delta_1, \ldots$; and wherein said means for generating respective time-offset correlations of a second signal comprises means for generating respective time-offset correlations of the second signal with the modulation sequence at the L first correlation times and the determined at least one second correlation time.

45. A receiver according to claim 40:

wherein said means for determining respective signal strengths of respective ones of the plurality of correlation outputs comprises means for determining respective instantaneous signal strengths for respective ones of the plurality of correlation outputs;

wherein said means for determining a set of first correlation times comprises means for selecting a set of L first correlation times $\tau_0, \ldots, \tau_{L-1}$ having corresponding determined instantaneous signal strengths exceeding a threshold, wherein $\tau_0, \ldots, \tau_{L-1}$ denotes a series of correlation times having decreasing determined instantaneous signal strengths associated therewith; and wherein said means for determining a second correlation time comprises the steps of:

means for determining respective time differentials $\Delta_1, \Delta_2, \ldots, \Delta_{M-1}$ between the first correlation time $\tau_0$ having the greatest determined instantaneous signal strength and respective other first correlation times of the set of L first correlation times, wherein $\Delta_1, \Delta_2, \ldots, \Delta_{M-1}$ denotes a series of time differentials for correlation times having decreasing determined instantaneous signal strengths associated therewith; and means for determining at least one second correlation time $\{\hat{\tau}_i\}$ in an order of preference beginning with a second correlation time $\hat{\tau}_0$ according to the relationship:

$\{\hat{\tau}_0, \hat{\tau}_1, \ldots\} = \tau_0-\Delta_1, \tau_0-\Delta_2, \tau_0-2\Delta_1, \tau_0-2\Delta_2, \ldots$; and wherein said means for generating respective time-offset correlations of a second signal comprises means for generating respective time-offset correlations of the second signal with the modulation sequence at the L first correlation times and the determined at least one second correlation time.

46. A receiver according to claim 40:

wherein said means for determining respective signal strengths of respective ones of the plurality of correlation outputs comprises means for determining respective average signal strengths for respective ones of the plurality of correlation outputs;

wherein said means for determining a set of first correlation times comprises means for selecting a set of M first correlation times $\tau_0, \ldots, \tau_{M-1}$ having determined average signal strengths associated therewith that are greater than a threshold, wherein $\tau_0, \ldots, \tau_{M-1}$ denotes a series of correlation times having decreasing determined average signal strength associated therewith; and wherein said means for determining a second correlation time comprises:

means for determining respective time differentials $\Delta_1, \Delta_2, \ldots, \Delta_{M-1}$ between the first correlation time $\tau_0$ and respective other first correlation times of the subset of M first correlation times; and means for determining at least one set of second correlation times $\{\hat{\tau}\}_i$, in an order of preference beginning with a set of second correlation times $\{\hat{\tau}\}_1$ according to the relationship:

$\{\hat{\tau}\}_1, \{\hat{\tau}\}_2, \ldots = \{\hat{\tau}\}_0-\Delta_1, \{\hat{\tau}\}_0+\Delta_1, \{\hat{\tau}\}_0-2\Delta_1, \{\hat{\tau}\}_0+2\Delta_1, \ldots$ where $\{\hat{\tau}\}_0$ is a zero-delay correlation time set; and wherein said means for generating respective time-offset correlations of a second signal comprises means for generating respective time-offset correlations of the second signal with the modulation sequence at the zero-delay correlation time set and the determined at least one set of second correlation times.

47. A receiver according to claim 40, wherein said means for determining a set of first correlation times comprises means for selecting correlation times of the plurality of correlation times having a corresponding determined signal strengths that meet a predetermined criterion.

48. A receiver according to claim 47, wherein said means for selecting comprises means for selecting correlation times of the plurality of correlation times having corresponding determined signal strengths exceeding a predetermined threshold.

49. A receiver according to claim 40, wherein said means for determining respective signal strengths of respective ones of the plurality of correlation outputs comprises means for determining one of absolute signal strengths or a relative signal strengths.

50. A receiver according to claim 49, wherein said means for determining respective signal strengths of respective ones of the plurality of correlation outputs comprises means for determining one of normalized signal strengths or signal to noise ratios.

51. A receiver according to claim 40, wherein said means for determining respective signal strengths of respective ones of the plurality of correlation outputs comprises means for determining one of average signal strengths or instantaneous signal strengths.

52. A receiver according to claim 38, wherein said means for determining respective signal strengths of the first correlation outputs comprises means for determining one of absolute signal strengths or relative signal strengths of the first correlation outputs.

53. A receiver according to claim 52, wherein said means for determining respective signal strengths of the first correlation outputs comprises means for determining one of normalized signal strengths or signal to noise ratios of the first correlation outputs.

54. A receiver according to claim 35:

wherein said means for generating respective correlation metrics comprises:

means for generating an estimated channel response from the first signal; and means for determining an inverse filter of the estimated channel response, including respective ones of a plurality of inverse filter coefficients and respective delays associated therewith; and wherein said means for generating respective time-offset correlations comprises means for generating respective time-offset correlation of the second signal with the modulation sequence at respective correlation times selected from the plurality of delays based on the inverse filter coefficients.

55. A receiver according to claim 54:
- wherein said means for generating an estimated channel response comprises means for generating an instantaneous channel response estimate; and
- wherein said means for determining an inverse filter comprises means for determining the inverse filter from the instantaneous channel response estimate.

56. A receiver according to claim 54:
- wherein said means for generating an estimated channel response comprises means for generating an average channel response estimate; and
- wherein said means for determining an inverse filter comprises means for determining the inverse filter from the average channel response estimate.

57. A receiver according to claim 54, wherein said means for generating respective time-offset correlations of the second signal with the modulation sequence at respective correlation times selected from the plurality of delays comprises means for generating respective time-offset correlations of the second signal with the modulation sequence at delays of the plurality of delays for which the corresponding inverse filter coefficient is greater than a predetermined threshold.

58. A receiver according to claim 35, further comprising:
- means for generating an interference-compensated signal from the generated time-offset correlations of the second signal with the modulation sequence; and
- means for recovering information from the interference-compensated signal.

* * * * *

UNITED STATES PATENT AND TRADEMARK OFFICE
CERTIFICATE OF CORRECTION

PATENT NO. : 6,683,924 B1
DATED : January 27, 2004
INVENTOR(S) : Ottosson et al.

It is certified that error appears in the above-identified patent and that said Letters Patent is hereby corrected as shown below:

Column 23,
Line 15, should read -- $\{\hat{\tau}_0, \hat{\tau}_1, \ldots\} = \{\tilde{\tau}_0 - \Delta_1, \tilde{\tau}_{M-1} + \Delta_1, \tilde{\tau}_0 - 2\Delta_1, \tilde{\tau}_{M-1} + 2\Delta_1, \ldots\}$; and --
Lines 40-41, should read -- including $M$ first correlation times $\tilde{\tau}_0, \ldots, \tilde{\tau}_{M-1}$, wherein $\tilde{\tau}_0, \ldots, \tilde{\tau}_{M-1}$ denotes a series of correlation --
Lines 53-67, should read -- $\{\hat{\tau}_0, \hat{\tau}_1, \ldots\} = \tilde{\tau}_0 - \Delta_1, \tilde{\tau}_{M-1} + \Delta_1, \tilde{\tau}_0 - \Delta_2, \tilde{\tau}_{M-1} + \Delta_2, \tilde{\tau}_0 - 2\Delta_1, \tilde{\tau}_{M-1} + 2\Delta_1, \tilde{\tau}_0 - 2\Delta_2, \tilde{\tau}_{M-1} + 2\Delta_2 \ldots$; and --

Column 24,
Lines 16-18, should read -- correlation times $\tilde{\tau}_0, \ldots, \tilde{\tau}_{I,-1}$ having corresponding determined instantaneous signal strengths exceeding a threshold, $\tilde{\tau}_0, \ldots, \tilde{\tau}_{I,-1}$ wherein denotes a series of first --
Line 24, should read -- $\Delta_{M-1}$ between the first correlation time $\tilde{\tau}_0$ having a --
Line 28, should read -- $\tilde{\tau}_0, \ldots, \tilde{\tau}_{I,-1}$, wherein $\Delta_1, \Delta_2, \ldots, \Delta_{M-1}$ denotes a --
Line 36, should read -- $\{\hat{\tau}_0, \hat{\tau}_1, \ldots\} = \tilde{\tau}_0 - \Delta_1, \tilde{\tau}_0 - 2\Delta_1, \tilde{\tau}_0 - 3\Delta_1, \ldots$; and --
Line 53, should read -- correlation times having $\tilde{\tau}_0, \ldots, \tilde{\tau}_{I,-1}$ corresponding --
Line 55, should read -- threshold, wherein $\tilde{\tau}_0, \ldots, \tilde{\tau}_{I,-1}$ denotes a series of --
Line 61, should read -- $\Delta_{M-1}$ between the first correlation time $\tilde{\tau}_0$ having the --

Column 25,
Line 5, should read -- $\{\hat{\tau}_0, \hat{\tau}_1, \ldots\} = \tilde{\tau}_0 - \Delta_1, \tilde{\tau}_0 - \Delta_2, \tilde{\tau}_0 - 2\Delta_1, \tilde{\tau}_0 - 2\Delta_2, \ldots$; and --
Line 20, should read -- correlation times $\tilde{\tau}_0, \ldots, \tilde{\tau}_{M-1}$ having determined --

Line 22, should read -- greater than a threshold, wherein $\tilde{\tau}_0, \ldots, \tilde{\tau}_{M-1}$ denotes --
Line 29, should read -- $\Delta_{M-1}$ between the first correlation time $\tilde{\tau}_0$ and --

Column 29,
Line 31, should read -- times $\tilde{\tau}_0, \ldots, \tilde{\tau}_{M-1}$, wherein $\tilde{\tau}_0, \ldots, \tilde{\tau}_{M-1}$ denotes --
Line 46, should read -- $\{\hat{\tau}_0, \hat{\tau}_1, \ldots\} = \{\tilde{\tau}_0 - \Delta_1, \tilde{\tau}_{M-1} + \Delta_1, \tilde{\tau}_0 - 2\Delta_1, \tilde{\tau}_{M-1} + 2\Delta_1, \ldots\}$; and --

Column 30,
Line 5, should read -- times $\tilde{\tau}_0, \ldots, \tilde{\tau}_{M-1}$, wherein $\tilde{\tau}_0, \ldots, \tilde{\tau}_{M-1}$ denotes --
Lines 21-35, should read -- $\{\hat{\tau}_0, \hat{\tau}_1, \ldots\} = \tilde{\tau}_0 - \Delta_1, \tilde{\tau}_{M-1} + \Delta_1, \tilde{\tau}_0 - \Delta_2, \tilde{\tau}_{M-1} + \Delta_2, \tilde{\tau}_0 - 2\Delta_1, \tilde{\tau}_{M-1} + 2\Delta_1, \tilde{\tau}_0 - 2\Delta_2, \tilde{\tau}_{M-1} + 2\Delta_2 \ldots$; and --
Line 51, should read -- first correlation times $\tilde{\tau}_0, \ldots, \tilde{\tau}_{I,-1}$ having corresponding --
Line 53, should read -- ... a threshold, wherein $\tilde{\tau}_0, \ldots, \tilde{\tau}_{I,-1}$ denotes a series --

Line 60, should read -- $\Delta_2, \ldots \Delta_{M-1}$ between the first correlation $\tilde{\tau}_0$ time --
Line 64, should read -- times $\tilde{\tau}_0, \ldots, \tilde{\tau}_{I,-1}$, wherein $\Delta_1, \Delta_2, \ldots, \Delta_{M-1}$ --

UNITED STATES PATENT AND TRADEMARK OFFICE
CERTIFICATE OF CORRECTION

PATENT NO. : 6,683,924 B1
DATED : January 27, 2004
INVENTOR(S) : Ottosson et al.

It is certified that error appears in the above-identified patent and that said Letters Patent is hereby corrected as shown below:

Column 31,
Line 6, should read -- $\{\hat{\tau}_0, \hat{\tau}_1, ...\} = \tilde{\tau}_0 - \Delta_1, \tilde{\tau}_0 - 2\Delta_1, \tilde{\tau}_0 - 3\Delta_1, ...;$ and --
Line 23, should read -- first correlation times $\tilde{\tau}_0, ..., \tilde{\tau}_{L-i}$ having corresponding --
Line 25, should read -- ... a threshold, wherein $\tilde{\tau}_0, ..., \tilde{\tau}_{L-1}$ denotes a series --
Line 32, should read -- $\Delta_2, ... \Delta_{M-1}$ between the first correlation time $\tilde{\tau}_0$ --
Line 45, should read -- $\{\hat{\tau}_0, \hat{\tau}_1, ...\} = \tilde{\tau}_0 - \Delta_1, \tilde{\tau}_0 - \Delta_2, \tilde{\tau}_0 - 2\Delta_1, \tilde{\tau}_0 - 2\Delta_2, ...;$ and --
Line 62, should read -- first correlation times $\tilde{\tau}_0, ..., \tilde{\tau}_{M-1}$ having determined --
Line 64, should read -- greater than a threshold, wherein $\tilde{\tau}_0, ..., \tilde{\tau}_{M-1}$ denotes --

Column 32,
Line 4, should read -- $\Delta_2, ... \Delta_{M-1}$ between the first correlation time $\tilde{\tau}_0$ --

Signed and Sealed this

Twenty-third Day of November, 2004

JON W. DUDAS
*Director of the United States Patent and Trademark Office*